(12) United States Patent
Bookbinder et al.

(10) Patent No.: US 11,150,403 B2
(45) Date of Patent: Oct. 19, 2021

(54) LOW DIAMETER OPTICAL FIBER

(71) Applicant: CORNING INCORPORATED, Corning, NY (US)

(72) Inventors: Dana Craig Bookbinder, Corning, NY (US); Steven Bruce Dawes, Corning, NY (US); Inna Igorevna Kouzmina, Corning, NY (US); Ming-Jun Li, Horseheads, NY (US); Manuela Ocampo, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/839,806

(22) Filed: Apr. 3, 2020

(65) Prior Publication Data
US 2020/0284976 A1 Sep. 10, 2020

Related U.S. Application Data

(63) Continuation of application No. 15/918,352, filed on Mar. 12, 2018, now Pat. No. 11,009,656, which is a
(Continued)

(51) Int. Cl.
*G02B 6/02* (2006.01)
*G02B 6/028* (2006.01)
(Continued)

(52) U.S. Cl.
CPC ..... *G02B 6/02395* (2013.01); *G02B 6/02009* (2013.01); *G02B 6/0281* (2013.01);
(Continued)

(58) Field of Classification Search
CPC ............ G02B 6/02395; G02B 6/02009; G02B 6/0281; G02B 6/0283; G02B 6/0286; G02B 6/0365; C08F 222/1006
See application file for complete search history.

(56) References Cited

U.S. PATENT DOCUMENTS

| 4,474,830 A | 10/1984 | Taylor |
| 4,585,165 A | 4/1986 | Iversen |

(Continued)

FOREIGN PATENT DOCUMENTS

| CN | 102099711 A | 6/2011 |
| CN | 101625438 B | 1/2012 |

(Continued)

OTHER PUBLICATIONS

Hagemann et al., The Performance of Depressed-Cladding Single-Mode Fibers with Different b/a Ratios, Journal of Lightwave Technology, vol. 9, No. 6, 1991. (Year: 1991).*
(Continued)

*Primary Examiner* — Peter Radkowski
(74) *Attorney, Agent, or Firm* — Kevin L. Bray

(57) ABSTRACT

Small-radius coated optical fibers having large mode field diameter and low bending losses. The coated fiber may have an outer radius of 110 μm or less, while providing a mode field diameter of 9.0 μm or greater and a bending loss when wrapped about a 15 mm mandrel of 0.5 dB/km or less at wavelength of 1550 nm. The coated fiber may have a mode field diameter of 9.2 μm or greater and may have a bending loss at 1550 nm of 0.25 dB/km or less when wrapped about a 20 mm mandrel or a bending loss at 1550 nm of 0.02 dB/km or less when wrapped about a 30 mm mandrel.

11 Claims, 7 Drawing Sheets

Related U.S. Application Data continuation of application No. 14/706,302, filed on May 7, 2015, now Pat. No. 9,995,874, which is a continuation of application No. 13/862,755, filed on Apr. 15, 2013, now Pat. No. 9,057,817.

(51) Int. Cl.
  *G02B 6/036* (2006.01)
  *C08F 222/10* (2006.01)

(52) U.S. Cl.
  CPC ......... *G02B 6/0283* (2013.01); *G02B 6/0286* (2013.01); *G02B 6/0365* (2013.01); *C08F 222/1006* (2013.01)

(56) References Cited

U.S. PATENT DOCUMENTS

| | | | |
|---|---|---|---|
| 4,609,718 A | 9/1986 | Bishop et al. | |
| 4,629,287 A | 12/1986 | Bishop | |
| 4,798,852 A | 1/1989 | Zimmerman et al. | |
| 4,857,568 A | 8/1989 | Butters et al. | |
| 4,962,992 A | 10/1990 | Chapin et al. | |
| 4,988,572 A | 1/1991 | Butters et al. | |
| 5,104,433 A | 4/1992 | Chapin et al. | |
| 5,410,567 A | 4/1995 | Brundage et al. | |
| 5,508,832 A | 4/1996 | Shimada | |
| 5,608,832 A | 3/1997 | Pfandl et al. | |
| 6,027,062 A | 2/2000 | Bacon et al. | |
| 6,171,698 B1 | 1/2001 | Khudyakov et al. | |
| 6,187,835 B1 | 2/2001 | Szum et al. | |
| 6,316,516 B1 | 11/2001 | Chien et al. | |
| 6,326,416 B1 | 12/2001 | Chien et al. | |
| 6,343,176 B1 | 1/2002 | Li et al. | |
| 6,362,249 B2* | 3/2002 | Chawla | C09D 155/005 522/182 |
| 6,470,128 B1 | 10/2002 | Khudyakov et al. | |
| 6,489,376 B1 | 12/2002 | Khudyakov et al. | |
| 6,539,152 B1 | 3/2003 | Fewkes et al. | |
| 6,563,996 B1 | 5/2003 | Winningham | |
| 6,579,914 B1 | 6/2003 | Gantt et al. | |
| 6,596,786 B2 | 7/2003 | Purvis et al. | |
| 6,621,970 B2 | 9/2003 | Khudyakov et al. | |
| 6,671,445 B2 | 12/2003 | Bickham et al. | |
| 6,711,330 B1 | 3/2004 | Donlagic | |
| 6,770,685 B1 | 8/2004 | Chang et al. | |
| 6,887,918 B2 | 5/2005 | Khudyakov et al. | |
| 6,904,218 B2 | 6/2005 | Sun et al. | |
| 6,925,239 B2 | 8/2005 | Wang et al. | |
| 7,068,902 B2 | 6/2006 | Gantt et al. | |
| 7,103,251 B2 | 9/2006 | Bickham et al. | |
| 7,171,087 B2 | 1/2007 | Takahashi | |
| 7,253,223 B2 | 8/2007 | Kawato et al. | |
| 7,272,289 B2 | 9/2007 | Bickham et al. | |
| 7,450,807 B2 | 11/2008 | Bickham et al. | |
| 7,526,169 B2 | 4/2009 | Bickham et al. | |
| 7,555,187 B2* | 6/2009 | Bickham | G02B 6/0365 385/127 |
| 7,565,820 B2 | 7/2009 | Foster et al. | |
| 7,620,282 B2 | 11/2009 | Bickham et al. | |
| 7,642,026 B2 | 1/2010 | Tada et al. | |
| 7,680,380 B2 | 3/2010 | Johnson | |
| 7,722,790 B2 | 5/2010 | Krishnan et al. | |
| 7,750,060 B2 | 7/2010 | Zahora et al. | |
| 7,773,846 B2* | 8/2010 | Bickham | G02B 6/02333 385/125 |
| 7,832,675 B2 | 11/2010 | Bumgarner et al. | |
| 7,853,110 B2* | 12/2010 | Bickham | G02B 6/02271 385/127 |
| 7,889,960 B2 | 2/2011 | De Montmorillon et al. | |
| 7,903,917 B2 | 3/2011 | Bickham et al. | |
| 8,009,950 B2 | 8/2011 | Molin et al. | |
| 8,103,143 B2 | 1/2012 | De Montmorillon et al. | |
| 8,200,057 B2 | 6/2012 | Han et al. | |
| 8,322,166 B2 | 12/2012 | Bookbinder et al. | |
| 8,385,701 B2 | 2/2013 | Bookbinder et al. | |
| 8,488,931 B2 | 7/2013 | Bigot-Astruc et al. | |
| 8,538,219 B2 | 9/2013 | Bickham et al. | |
| 8,588,569 B2 | 11/2013 | Bookbinder et al. | |
| 8,666,214 B2 | 3/2014 | Bookbinder et al. | |
| 8,724,950 B2 | 5/2014 | Molin et al. | |
| 8,750,664 B2 | 6/2014 | Zhang et al. | |
| 8,849,082 B2 | 9/2014 | Bookbinder et al. | |
| 8,891,925 B2 | 11/2014 | Bickham et al. | |
| 8,953,917 B2 | 2/2015 | Berkey et al. | |
| 9,042,695 B2 | 5/2015 | Donlagic | |
| 9,207,396 B2 | 12/2015 | Wang et al. | |
| 9,279,935 B2 | 3/2016 | Frigerio et al. | |
| 2001/0025062 A1 | 9/2001 | Szum et al. | |
| 2002/0028051 A1 | 3/2002 | Bickham et al. | |
| 2003/0021565 A1 | 1/2003 | Khudyakov et al. | |
| 2003/0026566 A1 | 2/2003 | Diep et al. | |
| 2003/0045599 A1 | 3/2003 | Khudyakov et al. | |
| 2003/0045601 A1 | 3/2003 | Purvis et al. | |
| 2003/0077059 A1 | 4/2003 | Chien et al. | |
| 2003/0123839 A1 | 7/2003 | Chou et al. | |
| 2003/0147613 A1 | 8/2003 | Khudyakov et al. | |
| 2004/0013382 A1 | 1/2004 | Van Eekelen et al. | |
| 2004/0126074 A1 | 7/2004 | Bickham et al. | |
| 2004/0228593 A1 | 11/2004 | Sun et al. | |
| 2005/0031283 A1 | 2/2005 | Fabian et al. | |
| 2005/0047740 A1 | 3/2005 | Gantt et al. | |
| 2005/0100295 A1 | 5/2005 | Wang et al. | |
| 2005/0238299 A1 | 10/2005 | Takahashi | |
| 2005/0249471 A1 | 11/2005 | Aikawa et al. | |
| 2006/0047037 A1 | 3/2006 | Kawato et al. | |
| 2006/0076534 A1 | 4/2006 | Szum et al. | |
| 2007/0077016 A1 | 4/2007 | Bickham et al. | |
| 2007/0280615 A1 | 12/2007 | De Montmorillon et al. | |
| 2008/0056654 A1 | 3/2008 | Bickham et al. | |
| 2008/0056658 A1 | 3/2008 | Bickham et al. | |
| 2008/0070135 A1 | 3/2008 | Tada et al. | |
| 2008/0113192 A1 | 5/2008 | Zahora et al. | |
| 2008/0124028 A1 | 5/2008 | Bickham et al. | |
| 2008/0205839 A1* | 8/2008 | Bickham | G02B 6/03688 385/127 |
| 2008/0226909 A1 | 9/2008 | Schmid et al. | |
| 2008/0226912 A1 | 9/2008 | Norlin et al. | |
| 2008/0226913 A1 | 9/2008 | Cattron et al. | |
| 2008/0278663 A1 | 11/2008 | Krishnan et al. | |
| 2008/0279517 A1* | 11/2008 | Bickham | G02B 6/0365 385/124 |
| 2008/0298758 A1 | 12/2008 | Johnson | |
| 2009/0060436 A1* | 3/2009 | Bickham | G02B 6/02333 385/124 |
| 2009/0092365 A1 | 4/2009 | Donlagic | |
| 2009/0123122 A1 | 5/2009 | Mukasa | |
| 2009/0148113 A1* | 6/2009 | Bickham | G02B 6/03688 385/127 |
| 2009/0175583 A1 | 7/2009 | Overton | |
| 2009/0186208 A1 | 7/2009 | Ishikawa et al. | |
| 2009/0279836 A1* | 11/2009 | de Montmorillon | G02B 6/0365 385/127 |
| 2010/0027951 A1 | 2/2010 | Bookbinder et al. | |
| 2010/0046899 A1 | 2/2010 | Bickham et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0254653 A1* | 10/2010 | Molin | G02B 6/0288 385/28 |
| 2010/0290781 A1* | 11/2010 | Overton | G02B 6/02395 398/43 |
| 2011/0058780 A1 | 3/2011 | Han et al. | |
| 2011/0064368 A1* | 3/2011 | Bookbinder | G02B 6/03683 385/123 |
| 2011/0085770 A1* | 4/2011 | Bigot-Astruc | G02B 6/0365 385/123 |

(56) References Cited

U.S. PATENT DOCUMENTS

| | | | |
|---|---|---|---|
| 2011/0142404 A1* | 6/2011 | Zhang | G02B 6/03611 385/128 |
| 2011/0164852 A1 | 7/2011 | De et al. | |
| 2011/0211796 A1 | 9/2011 | Bookbinder et al. | |
| 2011/0222824 A1 | 9/2011 | Nakanishi et al. | |
| 2011/0305423 A1 | 12/2011 | Molin et al. | |
| 2012/0033923 A1 | 2/2012 | Takenaga et al. | |
| 2012/0106909 A1 | 5/2012 | Bickham et al. | |
| 2012/0125053 A1 | 5/2012 | Bookbinder et al. | |
| 2012/0128314 A1 | 5/2012 | Wu et al. | |
| 2012/0129969 A1 | 5/2012 | Bishop et al. | |
| 2012/0142856 A1 | 6/2012 | Klun et al. | |
| 2012/0189258 A1 | 7/2012 | Overton et al. | |
| 2013/0044987 A1 | 2/2013 | Bickham et al. | |
| 2013/0071115 A1 | 3/2013 | Bennett et al. | |
| 2013/0136405 A1 | 5/2013 | Bookbinder et al. | |
| 2013/0136406 A1 | 5/2013 | Bookbinder et al. | |
| 2013/0136407 A1 | 5/2013 | Berkey et al. | |
| 2013/0136408 A1 | 5/2013 | Bookbinder et al. | |
| 2013/0272670 A1 | 10/2013 | Frigerio et al. | |
| 2015/0301276 A1 | 10/2015 | Wang et al. | |
| 2017/0075061 A1 | 3/2017 | Bookbinder et al. | |

FOREIGN PATENT DOCUMENTS

| | | |
|---|---|---|
| CN | 102156323 B | 6/2012 |
| CN | 102540327 A | 7/2012 |
| CN | 102768383 A | 11/2012 |
| EP | 2786185 A1 | 10/2014 |
| EP | 2816383 A1 | 12/2014 |
| JP | 2004361200 A | 12/2004 |
| JP | 2005-043093 A | 2/2005 |
| JP | 2005140609 A | 6/2005 |
| JP | 2005195921 A | 7/2005 |
| JP | 2006038898 A | 2/2006 |
| JP | 2006-528374 A | 12/2006 |
| JP | 2009-510520 A | 3/2009 |
| JP | 2010102138 A | 5/2010 |
| JP | 2011027945 A | 2/2011 |
| JP | 2011203552 A | 10/2011 |
| JP | 2013088457 A | 5/2013 |
| JP | 2013088458 A | 5/2013 |
| JP | 2013088607 A | 5/2013 |
| WO | 2004/092794 A1 | 10/2004 |
| WO | 2009/062131 A1 | 5/2009 |
| WO | 2009/104724 A1 | 8/2009 |
| WO | 2010/053356 A2 | 5/2010 |
| WO | 2013/082217 A1 | 6/2013 |

OTHER PUBLICATIONS

Jeong et al., Control of Free Spectral Range of Long Period Fiber Grating by Cladding Mode Waveguide Dispersion, Journal of the Optical Society of Korea, V. 7, N. 2, 2003 (Year: 2003).*

Donlagic, Denis, A low bending loss multimode fiber transmission system, Optics Express, vol. 17, No. 24, 2009, p. 22083.

European Patent Application No. 14721717.8 Office Action dated Nov. 9, 2018; 8 Pages; European Patent Office.

Hentschel et al., Self-Healing Supramolecular Block Copolymers, Angew. Chern. Int Ed 2012, 51,10561-10565 (Year: 2012).

International Search Report of the International Searching Authority; PCT/US2014/033280; dated Jul. 25, 2014; 6 Pages; European Patent Office.

Luo et al., Shape Memory Assisted Self-Healing Coating, ACS Macro Lett. 2013, 2, 2, 152-156 (Year: 2013).

Schmid et al., Optical Fiber Coatings, Chapter 4 of Specialty Optical Fibers Handbook, 2007 (Year: 2007).

Yang et al., Epoxy Toughening Using Low Viscosity Liquid Diglycidyl Ether of Ethoxylated Bisphenol-A. Journal of Applied Polymer Science. 123. 10.1002/app.34677 (Year: 2011).

Ware et al., Triple-Shape Memory Polymers Based on Self-Complementary Hydrogen Bonding. Macromolecules. 2012;45(2): 1062-1069 (Year: 2012).

Xie et al., Facile tailoring of thermal transition temperatures of epoxy shape memory polymers, Polymer 50 (2009) 1852-1856 (Year: 2009).

JP2016507602 Office Action dated Feb. 20, 2018, Japan Patent Office.

CN201480021480.8 First Office Action dated Feb. 5, 2018, China Patent Office.

Jay, John, An Overview of Macrobending and Microbending of Optical Fibers, 2010,http://www.corning.com/media/worldwide/coc/documents/Fiber/RC-%20White%20Papers/WP-General/WP1212_12-1 O.pdf.

Steenbergen, Richard, Everything You Always Wanted to Know about Optical Networking—but were afraid to ask, https://www.nanog.org/meetings/nanog48/presentations/Sunday/RAS_opticalnet_N48.pdf.

Li et al., Ultra-Low Bending Loss Single-Mode Fiber for FTTH, Journal of Lightwave Technology, vol. 27, No. 3,Feb. 1, 2009 (Year: 2009).

Japanese Patent Application No. 2020-003779; Office Action dated Dec. 2, 2020; 8 Pages (4 pages of English Translation and 4 pages of Original Document); Japanese Patent Office.

Extended European Search Report and Written Opinion; 20171420.1; dated Aug. 27, 2020; 8 pages; European Patent Office.

* cited by examiner

LOW DIAMETER OPTICAL FIBER

CROSS REFERENCE TO RELATED APPLICATIONS

This application is a continuation of U.S. patent application Ser. No. 15/918,352, filed on Mar. 12, 2018, which is a continuation of U.S. patent application Ser. No. 14/706,302, filed on May 7, 2015, which is a continuation of U.S. patent application Ser. No. 13/862,755, filed Apr. 15, 2013, the disclosures of which are hereby incorporated by reference in their entirety herein.

FIELD OF INVENTION

The present disclosure relates generally to optical fibers. More particularly, this disclosure relates to coated optical fibers having a refractive index profile with a depressed-index cladding region and a thin, low modulus primary coating. Most particularly, this disclosure relates to small-radius coated optical fibers that exhibit high mode field diameter and low bending losses.

TECHNICAL BACKGROUND

Coated optical fibers with small radii are attractive for reducing the size of cables, decreasing cable cost, and efficiently using existing duct infrastructure for cable installations. Reduced-radii fibers typically have the same glass radii as standard optical fibers (125 µm), but use thinner layers as primary and/or secondary coatings. Reduced coating thickness, however, compromises the protective function of the coatings. As a result, much effort in the field has been directed to developing new coating materials that maintain adequate protection at small thicknesses and new glass compositions or index profiles that can tolerate more pronounced bending without compromising signal intensity or quality. Although bend-insensitive coated optical fiber designs with reduced diameters have been proposed in the prior art (see, for example, US Patent Application Pub. No. 20100119202), the nominal mode field diameter (MFD) of these fibers at 1310 nm is typically only ~8.6-8.8 µm. Such mode field diameters lead to high splicing/connectorization losses upon connection of the reduced-diameter fiber to standard single mode fibers (SMF) (which have a nominal MFD of about 9.2 µm).

To avoid signal losses when connecting low-diameter fibers to existing, standard single mode fibers, it would be desirable to develop an optical fiber having a reduced radius and a mode field diameter that is compatible with that of standard single mode fibers.

SUMMARY

The present disclosure provides coated optical fibers having a radius of 110 µm or less, or 105 µm or less, or 100 µm or less, that possess large mode field diameters without experiencing significant bending-induced signal degradation. The reduced-radius coated fiber may comprise an inner glass region having a radius of at least 50 µm, or at least 55 µm, or at least 60 µm, or at least 62.5 µm in conjunction with surrounding primary and secondary coatings. Representative fibers may include, in concentric order, a glass core, a glass cladding, a primary coating and a secondary coating. The core may be a higher index glass region and may be surrounded by a lower index cladding. The cladding may include one or more inner cladding regions and an outer cladding region, where at least one of the inner cladding regions may have a lower refractive index than the outer cladding region. The primary coating may be formed from a lower modulus material and the secondary coating may be formed from a higher modulus material.

The core may include silica glass or a silica-based glass. Silica-based glass may be silica glass modified with an alkali metal (e.g. Na, K), an alkaline earth metal (e.g. Mg, Ca), a column III element (e.g. B), or a column V element (e.g. P); or a dopant. The refractive index across the core may be constant or variable. The core refractive index may be at a maximum at or near the center of the core and continuously decreases in the direction of the outer core boundary. The core refractive index profile may be or may approximate a Gaussian profile, a super-Gaussian profile, an $\alpha$ profile, or a step profile.

The cladding may include silica glass or a silica-based glass. The silica-based glass may be silica glass modified with an alkali metal (e.g. Na, K), an alkaline earth metal (e.g. Mg, Ca), a column III element (e.g. B), or a column V element (e.g. P); or a dopant. The cladding may include an inner cladding region and an outer cladding region, where the inner cladding region may have a lower refractive index than the outer cladding region. The inner cladding region may have a constant or continuously varying refractive index. The inner cladding region may have a refractive index that continuously decreases from its inner boundary to its outer boundary. The continuous decrease may be a linear decrease. The refractive index of the inner cladding region may form a trench in the index profile of the coated fiber. The index trench may be rectangular or triangular. The outer cladding region may have a constant refractive index.

The cladding may include a first inner cladding region adjacent the core and a second inner cladding region disposed between the first inner cladding region and the outer cladding region. The refractive index of the second inner cladding region may be lower than the refractive index of the first inner cladding region. The refractive index of the second inner cladding region may be lower than the refractive index of the outer cladding region. The refractive index of the second inner cladding region may be lower than the refractive indices of the first inner cladding region and the outer cladding region.

The refractive index of the second inner cladding region may be constant or continuously varying. The second inner cladding region may have a refractive index that continuously decreases from its inner boundary to its outer boundary. The continuous decrease may be a linear decrease. The refractive index of the second inner cladding region may form a trench in the index profile of the coated fiber. The trench is a region of depressed refractive index and may be rectangular or triangular. The outer cladding region may have a constant refractive index.

The refractive index profiles of the core and cladding may be achieved through control of a spatial distribution of updopants and/or downdopants in silica or silica-based glass.

The primary coating may be formed from a curable composition that includes an oligomer and a monomer. The oligomer may be a urethane acrylate or a urethane acrylate with acrylate substitutions. The urethane acrylate with acrylate substitutions may be a urethane methacrylate. The oligomer may include urethane groups. The oligomer may be a urethane acrylate that includes one or more urethane groups. The oligomer may be a urethane acrylate with acrylate substitutions that includes one or more urethane groups. Urethane groups may be formed as a reaction product of an isocyanate group and an alcohol group.

The primary coating may have an in situ modulus of elasticity of 1 MPa or less, or 0.50 MPa or less, or 0.25 MPa or less, or 0.20 MPa or less, or 0.19 MPa or less, or 0.18 MPa or less, or 0.17 MPa or less, or 0.16 MPa or less, or 0.15 MPa or less. The glass transition temperature of the primary coating may be −15° C. or less, or −25° C. or less, or −30° C. or less, or −40° C. or less. The glass transition temperature of the primary coating may be greater than −60° C., or greater than −50° C., or greater than −40° C. The glass transition temperature of the primary coating may be or between −60° C. and −15° C., or between −60° C. and −30° C., or between −60° C. and −40° C., or between −50° C. and −15° C., or between −50° C. and −30° C., or between −50° C. and −40° C.

The secondary coating may be formed from a curable secondary composition that includes one or more monomers. The one or more monomers may include bisphenol-A diacrylate, or a substituted bisphenol-A diacrylate, or an alkoxylated bisphenol-A diacrylate. The alkoxylated bisphenol-A diacrylate may be an ethoxylated bisphenol-A diacrylate. The curable secondary composition may further include an oligomer. The oligomer may be a urethane acrylate or a urethane acrylate with acrylate substitutions. The secondary composition may be free of urethane groups, urethane acrylate compounds, urethane oligomers or urethane acrylate oligomers.

The secondary coating may be a material with a higher modulus of elasticity and higher glass transition temperature than the primary coating. The in situ modulus of elasticity of the secondary coating may be 1200 MPa or greater, or 1500 MPa or greater, or 1800 MPa or greater, or 2100 MPa or greater, or 2400 MPa or greater, or 2700 MPa or greater. The secondary coating may have an in situ modulus between about 1500 MPa and 10,000 MPa, or between 1500 MPa and 5000 MPa. The in situ glass transition temperature of the secondary coating may be at least 50° C., or at least 55° C., or at least 60° C. or between 55° C. and 65° C.

The radius of the coated fibers coincides with the outer diameter of the secondary coating. The radius of the coated fiber may be 110 µm or less, or 105 µm or less, or 100 µm or less. Within the coated fiber, the glass radius (coinciding with the outer diameter of the cladding) may be at least 50 µm, or at least 55 µm, or at least 60 µm, or 62.5 µm. The glass may be surrounded by the primary coating. The outer radius of the primary coating may be 85 µm or less, 82.5 µm or less, or 80 µm or less, or 77.5 µm or less, or 75 µm or less. The balance of the coated fiber diameter is provided by the secondary coating.

Coated fibers in accordance with the present disclosure may be small-radius fibers that exhibit low bending losses while providing a mode field diameter that minimizes losses associated with splicing and connecting to standard single-mode fibers. The mode field diameter may be 9.0 µm or greater, or 9.1 µm or greater, or 9.2 µm or greater at 1310 nm.

The coated fibers may exhibit a bend loss at 1550 nm of less than 0.5 dB/turn when wrapped around a mandrel with a 15 mm diameter, or less than 0.5 dB/turn when wrapped around a mandrel with a 20 mm diameter, or less than 0.25 dB/turn when wrapped around a mandrel with a 20 mm diameter, or less than 0.02 dB/turn when wrapped around a mandrel with a 30 mm diameter, or less than 0.012 dB/turn when wrapped around a mandrel with a 30 mm diameter.

The optical and mechanical characteristics of the fibers of the present disclosure may be compliant with the G.652 standard. The fibers may have a cable cutoff wavelength of 1260 nm or less. The fibers may have a zero dispersion wavelength $\lambda_0$ in the range 1300 nm $\leq \lambda_0 \leq$ 1324 nm.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
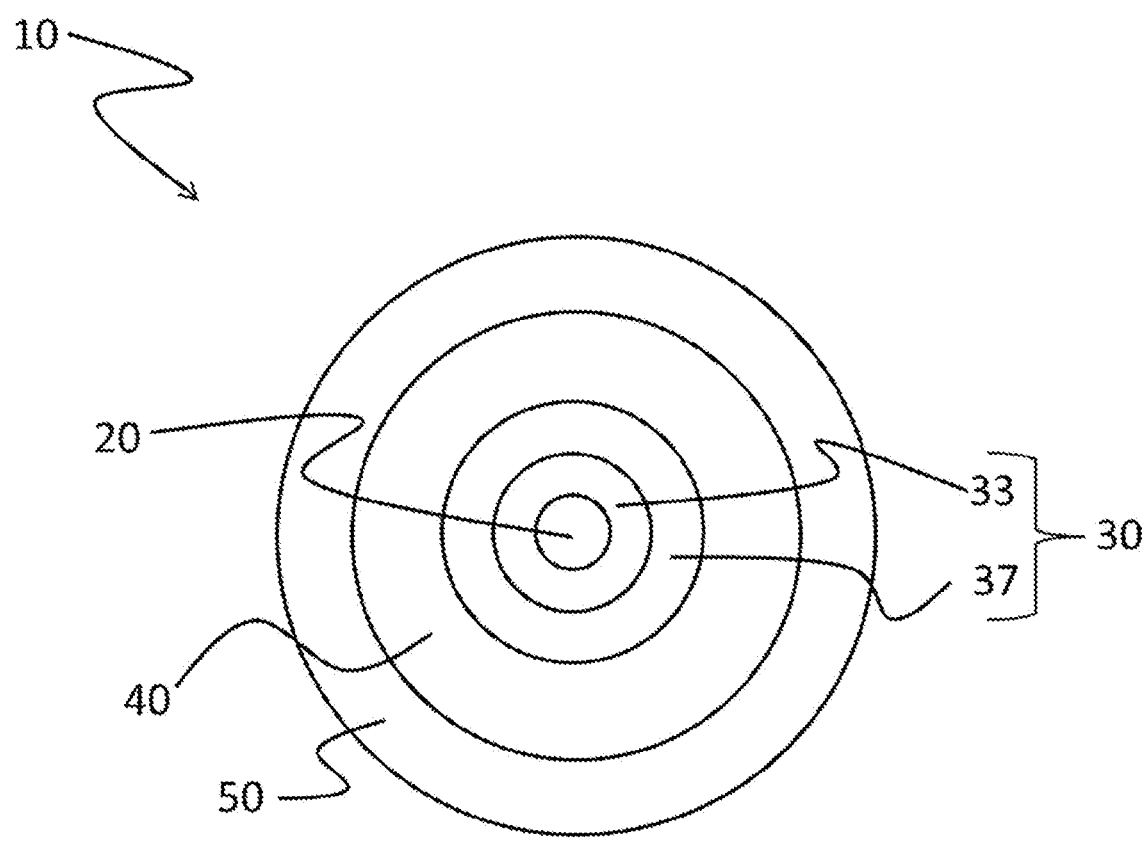
FIG. 1 is a schematic depiction in cross-section of a fiber having a core, inner cladding region, outer cladding region, a primary coating and a secondary coating.

The present disclosure concerns coated optical fibers that may combine a small diameter, a large mode field diameter, and low microbending loss. A brief explanation of selected terminology used herein is now presented:

The "refractive index profile" is the relationship between refractive index or relative refractive index and fiber radius.

The "relative refractive index percent" is defined as $$\Delta \% = 100 \frac{n^2(r) - n_s^2}{2n^2(r)}$$

where n(r) is the refractive index of the fiber at the radial distance r from the fiber's centerline, unless otherwise specified, and $n_s$ is the refractive index of pure silica at a wavelength of 1550 nm. As used herein, the relative refractive index is represented by Δ (or "delta"), Δ % (or "delta %"), or %, all of which are used interchangeably herein, and its values are given in units of percent or %, unless otherwise specified. Relative refractive index may also be expressed as Δ(r) or Δ(r) %.

"Chromatic dispersion", which may also be referred to as "dispersion", of a waveguide fiber is the sum of the material dispersion, the waveguide dispersion, and the intermodal dispersion at a wavelength λ. In the case of single-mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength.

The term "α-profile" refers to a relative refractive index profile $\Delta(r)$ that has the following functional form:

$$\Delta(r) = \Delta(r_0)\left[1 - \left[\frac{|r-r_0|}{(r_1-r_0)}\right]^\alpha\right]$$

where $r_0$ is the point at which $\Delta(r)$ is maximum, $r_1$ is the point at which $\Delta(r)$ is zero, and r is in the range $r_i \leq r \leq r_f$, where $r_i$ is the initial point of the α-profile, $r_f$ is the final point of the α-profile, and α is a real number.

The mode field diameter (MFD) is measured using the Petermann II method and was determined from:

$$MFD = 2w$$

$$w^2 = 2\frac{\int_0^\infty (f(r))^2 r\, dr}{\int_0^\infty \left(\frac{df(r)}{dr}\right)^2 r\, dr}$$

where f(r) is the transverse electric field distribution of the guided light and r is radial position in the fiber.

The bend resistance of a waveguide fiber may be gauged by induced attenuation under prescribed test conditions. Various tests are used to assess bending losses including the lateral load microbend test, pin array test, and mandrel wrap test.

In the lateral load test, a prescribed length of waveguide fiber is placed between two flat plates. A #70 wire mesh is attached to one of the plates. A known length of waveguide fiber is sandwiched between the plates and a reference attenuation at a selected wavelength (typically within the range of 1200-1700 nm, e.g., 1310 nm or 1550 nm or 1625 nm) is measured while the plates are pressed together with a force of 30 Newtons. A 70 Newton force is then applied to the plates and the increase in attenuation at the selected wavelength in dB/m is measured. The increase in attenuation is the lateral load wire mesh (LLWM) attenuation of the waveguide.

The macrobend resistance of the fiber can be gauged by measuring the induced attenuation increase in a mandrel wrap test. In the mandrel wrap test, the fiber is wrapped one or more times around a cylindrical mandrel having a specified diameter and the increase in attenuation at a specified wavelength due to the bending is determined. Attenuation in the mandrel wrap test is expressed in units of dB/turn, where one turn refers to one revolution of the fiber about the mandrel.

The "pin array" bend test is used to compare the relative resistance of waveguide fiber to bending. To perform this test, attenuation loss at a selected wavelength is measured for a waveguide fiber in a configuration with essentially no bending loss. The waveguide fiber is then woven about the pin array and the attenuation at the selected wavelength (typically within the range of 1200-1700 nm, e.g., 1310 nm or 1550 nm or 1625 nm) is again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cable cutoff" (also known as the "22-meter cutoff") is typically lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards (Electronics Industry Alliance—Telecommunications Industry Association Fiber Optics Standards, more commonly known as FOTP's). Cable cutoff measurement is described in EIA-455-170 Cable Cutoff Wavelength of Single-mode Fiber by Transmitted Power, or "FOTP-170". Unless otherwise noted herein, optical properties (such as dispersion, dispersion slope, etc.) are reported for the LP01 mode.

The present disclosure provides small-radius coated fibers with excellent microbending and macrobending performance and a mode field diameter that may permit splicing and connecting to standard single-mode fibers with minimal losses. The coated fibers of the present disclosure may overcome sacrifices in mode field diameter and/or bending losses that have accompanied efforts in the prior art to achieve small-radius fibers. With the present coated fibers, small radii may be achievable without sacrificing mode field diameter or bending performance. The present disclosure accordingly may provide compact coated fibers that can be assembled in high density configurations for internal installations and yet provide good matching and low losses when integrated with external single-mode fibers. Different profile designs are outlined below that result in good fiber microbend and macrobend performance even when the thickness of the coating layers is small. Mechanical properties, compositions, and geometry of reduced-thickness primary and secondary coating layers that may yield low microbending and macrobending losses and good puncture resistance are disclosed. Unless otherwise specified, all wavelength-dependent results are based on a wavelength of 1550 nm.

The present coated fibers may include a cladding having two regions and a refractive index profile that differs in the two regions. The design of the refractive index profile of the cladding may diminish the sensitivity of the coated fiber to bending and may enable use of a primary coating with reduced thickness relative to prior art coated fibers. A thinner primary coating leads to a reduction in overall coated fiber diameter to provide compact coated fibers that can be densely packed and/or readily installed in existing fiber infrastructure. The mechanical properties of the primary coating may be chosen such that good microbending performance of the coated fiber is achieved, even when the thickness of the primary coating is reduced.

Figure 2:
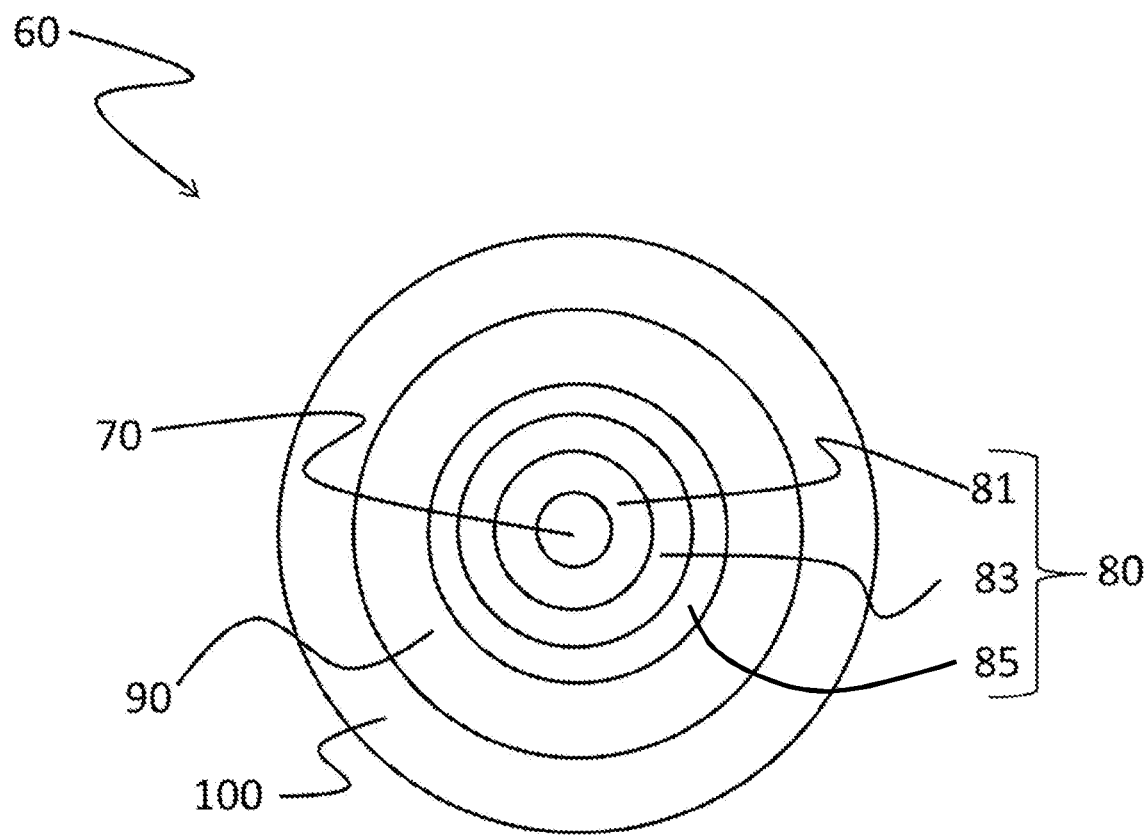
FIG. 2 is a schematic depiction in cross-section of a fiber having a core, two inner cladding regions, an outer cladding region, a primary coating and a secondary coating.

The coated fibers of the present disclosure may include a core, cladding, primary coating, and secondary coating, where the cladding may include two or more regions with differing refractive index profiles. A schematic cross-sectional depiction of a first of many coated fibers in accordance with the present disclosure is shown in FIG. 1. Fiber 10 includes core 20, cladding 30, primary coating 40, and secondary coating 50. Cladding 30 includes inner cladding region 33 and outer cladding region 37. The schematic cross-section of a second of many coated fibers in accordance with the present disclosure is shown in FIG. 2. Fiber 60 includes core 70, cladding 80, primary coating 90 and secondary coating 100. Cladding 80 includes first inner cladding region 81, second inner cladding region 83, and outer cladding region 85.

The core and cladding may be silica or silica-based glass and may optionally include an updopant or a downdopant. Silica-based glass may be silica glass modified by an alkali or alkaline earth element, or a column III element (e.g. B, Al), or a column V element (e.g. P). The radius of the core may be in the range of 4-10 μm for single-mode fiber. The cladding may include two or more regions that differ in refractive index profile and may extend to an outer radius of at least 50 μm, or at least 55 μm, or at least 60 μm, or 62.5 μm.

The refractive index across the core may be constant or variable. The core refractive index may be at a maximum at or near the center of the core and may continuously decrease in the direction of the outer core boundary. The core refractive index profile may be or may approximate a Gaussian profile, a super-Gaussian profile, an α-profile, or a step profile.

The cladding may include an inner cladding region and an outer cladding region, where the inner cladding region may have a lower refractive index than the outer cladding region. The refractive index of the inner cladding region may be constant or continuously varying. The inner cladding region may have a refractive index that continuously decreases from its inner boundary to its outer boundary. The continuous decrease may be a linear decrease. The refractive index of the inner cladding region may form a trench in the refractive index profile of the coated fiber. The trench is a depressed index region and may be rectangular or triangular. The outer cladding region may have a constant or continuously varying refractive index. The minimum refractive index of the inner core region may be less than the maximum refractive index of the outer cladding region.

The cladding may include a first inner cladding region adjacent the core and a second inner cladding region disposed between the first inner cladding region and the outer cladding region. The refractive index of the second inner cladding region may be lower than the refractive index of the first inner cladding region. The minimum refractive index of the second inner cladding region may be lower than the maximum refractive index of the first inner cladding region. The refractive index of the second inner cladding region may be lower than the refractive index of the outer cladding region. The minimum refractive index of the second inner cladding region may be lower than the maximum refractive index of the outer cladding region. The refractive index of the second inner cladding region may be lower than the refractive indices of the first inner cladding region and the outer cladding region. The minimum refractive index of the second inner cladding region may be lower than the maximum refractive indices of the first inner cladding region and the outer cladding region.

The refractive index of the second inner cladding region may be constant or continuously varying. The second inner cladding region may have a refractive index that continuously decreases from its inner boundary to its outer boundary. The continuous decrease may be a linear decrease. The refractive index of the second inner cladding region may form a trench in the refractive index profile of the coated fiber. The trench is a depressed index region and may be rectangular or triangular. The depressed index region may characterized by a profile moat volume, $V_3$, in units of % μm², equal to:

$$V_3 = 2\int_{r2}^{r3} \Delta(r) r \, dr$$

The magnitude $|V_3|$ of the moat volume may be at least 30% μm², or at least 50% μm², or at least 65% μm². The magnitude $|V_3|$ of the moat volume may also be less than 80% μm², or less than 75% μm², or between 30% μm² and 80% μm², inclusive. The terms "moat" and "trench" are used interchangeably herein.

Figure 3A:
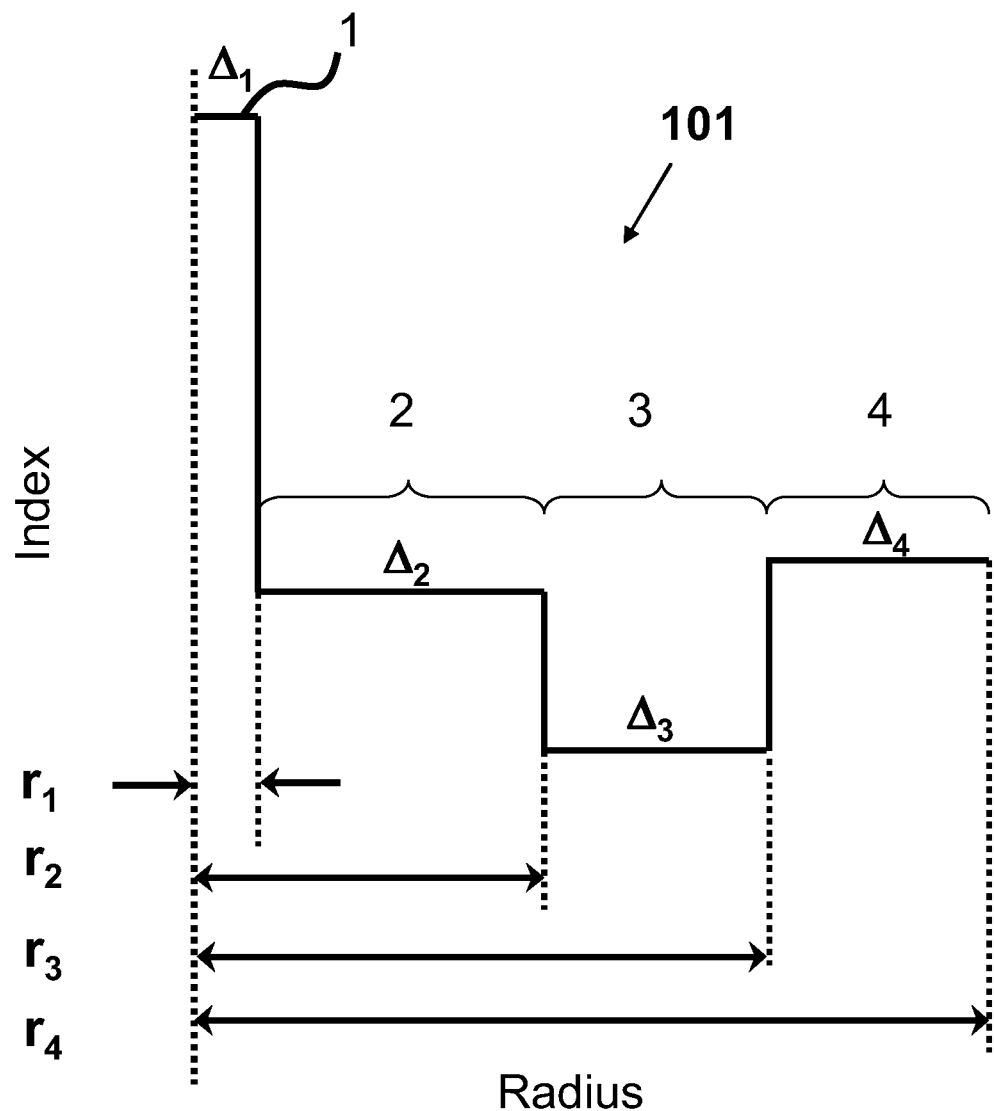
FIGS. 3A and 3B are schematic depictions of illustrative refractive index profiles.
Figure 3B:
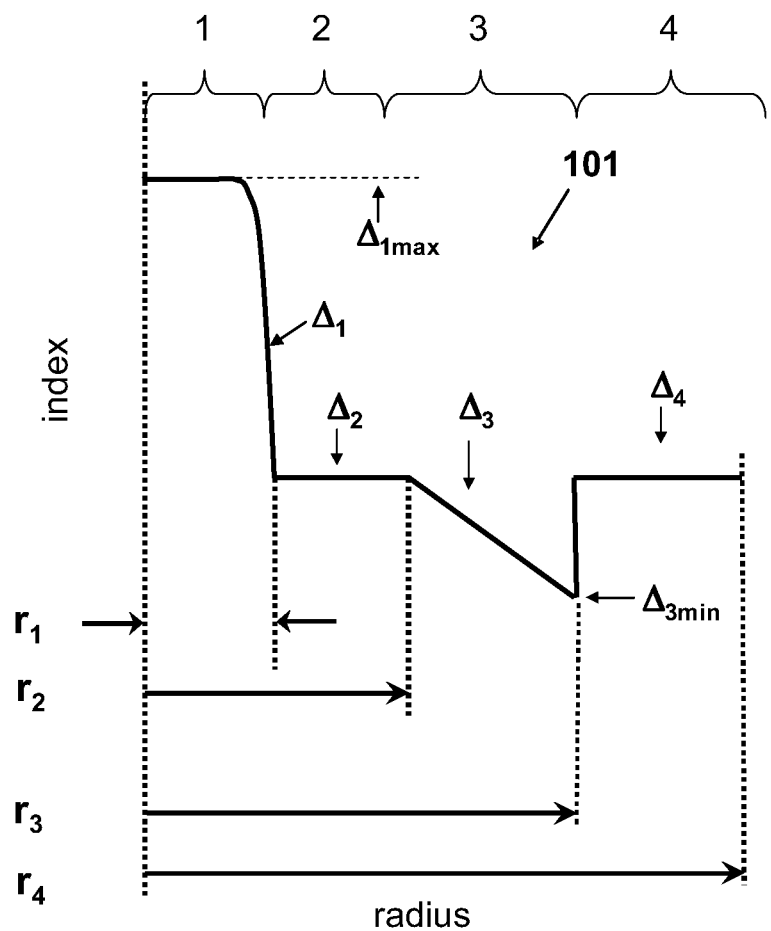

Representative refractive index profiles for the core and cladding are presented in FIGS. 3A and 3B. FIG. 3A shows a rectangular trench profile for a fiber (101) having a core (1) with outer radius $r_1$ and refractive index $\Delta_1$, a first inner cladding region (2) extending from radial position $r_1$ to radial position $r_2$ and having refractive index $\Delta_2$, a second inner cladding region (3) extending from radial position $r_2$ to radial position $r_3$ and having refractive index $\Delta_3$, and an outer cladding region (4) extending from radial position $r_3$ to radial position $r_4$ and having refractive index $\Delta_4$. In the profile of FIG. 3A, the second inner cladding region (3) may be referred to herein as a rectangular trench and may have a constant refractive index that is less than the refractive indices of the first inner cladding region (2) and the outer cladding region (4). The core (1) may have the highest refractive index in the profile. The core (1) may include a lower index region at or near the centerline (known in the art as a "centerline dip"). It should be noted that the first inner cladding region (2) is optional and may be eliminated.

FIG. 3B shows a triangular trench refractive index profile for a fiber (101) having a core (1) with radius $r_1$ and refractive index $\Delta_1$ with a maximum $\Delta_{1MAX}$, a first inner cladding region (2) extending from radial position $r_1$ to radial position $r_2$ and having refractive index $\Delta_2$, a second inner cladding region (3) extending from radial position $r_2$ to radial position $r_3$ and having refractive index $\Delta_3$ with a minimum $\Delta_{3MIN}$, and an outer cladding region (4) extending from radial position $r_3$ to radial position $r_4$ and having refractive index $\Delta_4$. In the profile of FIG. 3B, the second inner cladding region (3) may be referred to herein as a triangular trench and may have a continuously decreasing refractive index between radial positions $r_2$ and $r_3$, where the average and minimum refractive index of the triangular trench may be less than the refractive indices of the first inner cladding region (2) and the outer cladding region (4). The core (1) may have the highest refractive index in the profile. The core (1) may include a lower index region at or near the centerline with a refractive index less than $\Delta_{1MAX}$. It should be noted that the first inner cladding region (2) is optional and may be eliminated.

The refractive index profiles of the core and cladding may be achieved through control of the spatial distribution of dopants or modifiers in silica or silica-based glass. Updopants (e.g. $GeO_2$, $Al_2O_3$, $P_2O_5$, $TiO_2$, Cl, Br) may be used to create regions of increased refractive index and downdopants (e.g. F, $B_2O_3$, non-periodic voids) may be used to create regions of decreased refractive index. Regions of constant refractive index may be formed by not doping or by doping at a uniform concentration. Regions of variable refractive index may be formed through non-uniform spatial distributions of dopants. The triangular trench shown in FIG. 3B, for example, may be established by incorporating F as a down-dopant with a non-uniform spatial concentration profile. The concentration of F at radial position $r_2$ may be less than the concentration of F at radial position $r_3$.

The coated fiber may include regions interposed between the core and first inner cladding region, or between the first inner cladding region and the second inner cladding region, or between the second inner cladding region and the outer cladding region, or between the outer cladding region and the primary coating, or between the primary coating and the secondary coating. The fiber may have a core with an outer radius $r_1$ and refractive index $\Delta_1$ with a maximum value $\Delta_{1MAX}$ and a minimum value $\Delta_{1MIN}$, a first inner cladding region having an outer radius $r_2$ and having refractive index $\Delta_2$ with a maximum value $\Delta_{2MAX}$ and a minimum value $\Delta_{2MIN}$, a second inner cladding region having an outer radius $r_3$ and having refractive index $\Delta_3$ with a maximum value $\Delta_{3MAX}$ and a minimum value $\Delta_{3MIN}$, an outer cladding region having an outer radius $r_4$ and having refractive index $\Delta_4$ with a maximum value $\Delta_{4MAX}$ and a minimum value $\Delta_{4MIN}$, a primary coating having outer radius $r_5$, and a secondary coating having outer radius $r_6$, where $r_6 > r_5 > r_4 > r_3 > r_2 > r_1$.

The core and cladding of the present coated fibers may be produced in a single-step operation or multi-step operation by methods which are well known in the art. Suitable methods include: the double crucible method, rod-in-tube procedures, and doped deposited silica processes, also commonly referred to as chemical vapor deposition ("CVD") or vapor phase oxidation. A variety of CVD processes are known and are suitable for producing the core and cladding layer used in the coated optical fibers of the present invention. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

The primary coating may have a lower modulus than the secondary coating. The primary coating may be formed from a primary composition that includes a curable oligomer. The curable primary composition may also include monomers, a polymerization initiator, and one or more additives. Unless otherwise specified or implied herein, the weight percent (wt %) of a particular component in a curable primary composition refers to the amount of the component present in the curable primary composition on an additive-free basis. Generally, the weight percents of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

The oligomer of the curable primary composition may be a urethane acrylate oligomer, or a urethane acrylate oligomer that includes one or more urethane groups, or a urethane acrylate oligomer that includes one or more aliphatic urethane groups, or a urethane acrylate oligomer that includes a single urethane group, or a urethane acrylate oligomer that includes a single aliphatic urethane group. The urethane group may be formed from a reaction between an isocyanate group and an alcohol group.

The oligomer may be an acrylate-terminated oligomer. Preferred acrylate-terminated oligomers for use in the primary curable compositions include BR3731, BR3741, BR582 and KWS4131, from Dymax Oligomers & Coatings; polyether urethane acrylate oligomers (e.g., CN986, available from Sartomer Company); polyester urethane acrylate oligomers (e.g., CN966 and CN973, available from Sartomer Company, and BR7432, available from Dymax Oligomers & Coatings); polyether acrylate oligomers (e.g., GENOMER 3456, available from Rahn AG); and polyester acrylate oligomers (e.g., EBECRYL 80, 584 and 657, available from Cytec Industries Inc.). Other oligomers are described in U.S. Pat. Nos. 4,609,718; 4,629,287; and 4,798,852, the disclosures of which are hereby incorporated by reference in their entirety herein.

The oligomer of the primary curable composition may include a soft block with a number average molecular weight ($M_n$) of about 4000 g/mol or greater. Examples of such oligomers are described in U.S. patent application Ser. No. 09/916,536, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the primary curable composition may be between about 5 wt % and about 95 wt %, or between about 25 wt % and about 65 wt %, or between about 35 wt % and about 55 wt %.

The monomer component of the primary curable composition may be selected to be compatible with the oligomer, to provide a low viscosity formulation, and/or to increase the refractive index of the primary coating. The monomer may also be selected to provide curable compositions having decreased gel times and low moduli. The primary curable composition may include a single monomer or a combination of monomers. The monomers may include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof. The monomer component may include compounds having the general formula $R_2-R_1-O-(CH_2CH_3CH-O)_n-COCH=CH_2$, where $R_1$ and $R_2$ are aliphatic, aromatic, or a mixture of both, and n=1 to 10, or $R_1-O-(CH_2CH_3CH-O)_n-COCH=CH_2$, where $R_1$ is aliphatic or aromatic, and n=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The monomer component of the primary curable composition may also include a multifunctional (meth)acrylate. As used herein, the term "(meth)acrylate" means acrylate or methacrylate. Multifunctional (meth)acrylates are (meth) acrylates having two or more polymerizable (meth)acrylate moieties per molecule. The multifunctional (meth)acrylate may have three or more polymerizable (meth)acrylate moieties per molecule. Examples of multifunctional (meth) acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth)acrylate. A multifunctional (meth)acrylate may be present in the primary curable composition at a concentration of from 0.05-15 wt %, or from 0.1-10 wt %.

The monomer component of the primary curable compositions may include an N-vinyl amide such as an N-vinyl lactam, or N-vinyl pyrrolidinone, or N-vinyl caprolactam. The N-vinyl amide monomer may be present in the primary curable composition at a concentration from 0.1-40 wt %, or from 2-10 wt %.

The curable primary coating composition may include one or more monofunctional (meth)acrylate monomers in an amount from 5-95 wt %, or from 30-75 wt %, or from 40-65 wt %. The curable primary coating composition may include one or more monofunctional aliphatic epoxy acrylate monomers in an amount from 5-40 wt %, or from 10-30 wt %.

The monomer component of the primary curable composition may include a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth)acrylate (each available from Aldrich).

The hydroxyfunctional monomer may be present in an amount sufficient to improve adhesion of the primary coating to the optical fiber. The hydroxyfunctional monomer may be present in the primary curable composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total monomer content of the primary curable composition may be between about 5 wt % and about 95 wt %, or between about 30 wt % and about 75 wt %, or between about 40 wt % and about 65 wt %.

The monomer present in the primary curable composition may include an N-vinyl amide monomer at a concentration of 0.1 to 40 wt % or 2 to 10 wt % in combination with one or more difunctional urethane acrylate oligomers in an amount from 5 to 95 wt %, or from 25 to 65 wt % or from 35 to 55 wt %.

The primary coating composition may include one or more monofunctional (meth)acrylate monomers in an amount of from about 5 to 95 wt %; an N-vinyl amide monomer in an amount of from about 0.1 to 40 wt %; and one or more difunctional urethane acrylate oligomers that include a polyol reacted with an isocyanate to form a urethane, where the oligomer is present in an amount of from about 5 to 95 wt %. The polyol may be a polypropylene glycol and the isocyanate may be an aliphatic diisocyanate.

The primary coating composition may include one or more monofunctional (meth)acrylate monomers in an amount of from about 40 to 65% by weight; an N-vinyl amide monomer in an amount of from about 2 to 10% by weight; and one or more polypropylene glycol-based difunctional urethane acrylate oligomers in an amount of from about 35 to 60% by weight.

The glass transition temperature of the primary coating may influence the microbend performance of the fibers at low temperature. It may be desirable for the primary coating to have a glass transition temperature below the lowest projected use temperature of the coated optical fiber. The glass transition temperature of the primary coating may be −15° C. or less, or −25° C. or less, or −30° C. or less, or −40° C. or less. The glass transition temperature of the primary coating may be greater than −60° C., or greater than −50° C., or greater than −40° C. The glass transition temperature of the primary coating may be or between −60° C. and −15° C., or between −60° C. and −30° C., or between −60° C. and −40° C., or between −50° C. and −15° C., or between −50° C. and −30° C., or between −50° C. and −40° C.

The primary coating may have a lower modulus of elasticity than the secondary coating. A low modulus may allow the primary coating to protect the core and cladding by efficiently dissipating internal stresses that arise when the exterior of the fiber is bent or subjected to an external force. As used herein, in situ modulus of the primary coating is the modulus measured by the technique that is now described.

A six-inch fiber sample is used for the measurement of the in situ modulus of the primary coating. A one-inch section from the center of the six-inch sample is window stripped and wiped with isopropyl alcohol. The sample is mounted on a sample holder/alignment stage equipped with 10 mm×5 mm aluminum tabs to which the sample is glued. The two tabs are set so that the 10 mm length is laid horizontally with a 5 mm gap between two tabs. The fiber is laid horizontally on the sample holder across the tabs. The coated end of the fiber is positioned on one tab and extended halfway into the 5 mm space between the tabs and the stripped glass is positioned over the other half of the 5 mm gap and on the other tab. The sample is lined up and then moved out of the way so that a small dot of glue can be applied to the half of each tab closest to the 5 mm gap. The fiber is then brought back over the tabs and centered. The alignment stage is then raised until the glue just touches the fiber. The coated end is then pulled through the glue such that the majority of the sample in the 5 mm gap between the tabs is stripped glass. The very tip of the coated end is left extended beyond the glue on the tab so that the region to be measured is left exposed. The sample is left to dry. The length of fiber fixed to the tabs is trimmed to 5 mm. The coated length embedded in glue, the non-embedded length (between the tabs), and the end-face primary diameter are measured.

Measurements can be performed on an instrument such as a Rheometrics DMTA IV at a constant strain of 9e-6 1/s for a time of forty-five minutes at room temperature (~21° C.). The gauge length is 15 mm. Force and the change in length are recorded and used for the calculation of primary modulus. Samples are prepared by removing any epoxy from the tabs that would interfere with the 15 mm clamping length to insure there is no contact with the fiber and that the sample is secured squarely to the clamps. Once the instrument force is zeroed out, the non-coated end is mounted to the lower clamp (measurement probe). The tab containing the coated end of the fiber is mounted to the upper (fixed) clamp. The test is then executed and the sample is removed once the analysis is complete.

The in situ modulus of the primary coating may be 1 MPa or less, or 0.50 MPa or less, or 0.25 MPa or less, or 0.20 MPa or less, or 0.19 MPa or less, or 0.18 MPa or less, or 0.17 MPa or less, or 0.16 MPa or less, or 0.15 MPa or less, or between 0.01 MPa and 1.0 MPa, or between 0.01 MPa and 0.50 MPa, or between 0.01 MPa and 0.20 MPa.

The primary curable composition may also include polymerization initiators, antioxidants, and other additives familiar to the skilled artisan.

The polymerization initiator may facilitate initiation of the polymerization process associated with the curing of the primary composition to form the primary coating. Polymerization initiators may include thermal initiators, chemical initiators, electron beam initiators, and photoinitiators. For many (meth)acrylate-based coating formulations, photoinitiators such as ketonic photoinitiating additives and/or phosphine oxide additives may be employed. When used in the photoformation of the primary coating of the present disclosure, the photoinitiator may be present in an amount sufficient to provide rapid ultraviolet curing.

Suitable photoinitiators may include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The photoinitiator component of the primary curable composition may consist of a single photoinitiator or a combination of two or more photoinitiators. The total photoinitiator content of the primary curable composition may be up to about 10 wt %, or between about 0.5 wt % and about 6 wt %.

In addition to monomer(s), oligomer(s), and polymerization initiator(s), the primary curable composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the polymerization product formed from the primary curable composition. Other additives may affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, the disclosures of which are hereby incorporated by reference herein.

It may be desirable to include an adhesion promoter in the primary curable composition. An adhesion promoter is a compound that may facilitate adhesion of the primary coating and/or primary composition to the cladding. Suitable adhesion promoters include alkoxysilanes, organotitanates, and zirconates. Representative adhesion promoters include 3-mercaptopropyl-trialkoxysilane (e.g., 3-MPTMS, available from Gelest (Tullytown, Pa.)); bis(trialkoxysilyl-ethyl) benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter may be present in the primary composition in an amount between about 0.02 pph to about 10 pph, or between about 0.05 pph and 4 pph, or between about 0.1 pph to about 2 pph, or between about 0.1 pph to about 1 pph.

The primary coating composition may also include a strength additive, as described in U.S. Published Patent Application No. 20030077059, the disclosure of which is hereby incorporated by reference herein in its entirety. Representative strength additives include mercapto-functional compounds, such as N-(tert-butoxycarbonyl)-L-cysteine methyl ester, pentaerythritol tetrakis(3-mercaptopropionate), (3-mercaptopropyl)-trimethoxysilane; (3-mercaptopropyl)trimethoxysilane, and dodecyl mercaptan. The strength additive may be present in the primary curable composition in an amount less than about 1 pph, or in an amount less than about 0.5 pph, or in an amount between about 0.01 pph and about 0.1 pph.

A representative antioxidant is thiodiethylene bis[3-(3,5-di-tert-butyl)-4-hydroxy-phenyl) propionate] (e.g., IRGANOX 1035, available from BASF).

It may be desirable to include an optical brightener in the primary curable composition. Representative optical brighteners include TINOPAL OB (available from BASF); Blankophor KLA (available from Bayer); bisbenzoxazole compounds; phenylcoumarin compounds; and bis(styryl) biphenyl compounds. The optical brightener may be present in the primary curable composition at a concentration of 0.005 pph-0.3 pph.

It may also be desirable to include an amine synergist in the primary curable composition. Representative amine synergists include triethanolamine; 1,4-diazabicyclo[2.2.2]octane (DABCO), triethylamine, and methyldiethanolamine. The amine synergist may be present at a concentration of 0.02 pph-0.5 pph.

The secondary coating may protect the fiber from mechanical damage and the external environment. The secondary coating may be formed from a curable secondary composition that includes one or more monomers. The monomers may include ethylenically unsaturated compounds. The curable secondary composition may also include one or more oligomers, one or more polymerization initiators, and one or more additives as described more fully herein.

Unless otherwise specified or implied herein, the weight percent (wt %) of a particular component in a curable secondary composition refers to the amount of the component present in the curable secondary composition on an additive-free basis. Generally, the weight percents of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

In order to reduce cost, the oligomer content urethane oligomer content, or urethane acrylate oligomer content of the secondary composition may be minimized. Relative to the prevailing secondary compositions known in the art, the oligomer content, urethane oligomer content, or urethane acrylate oligomer content of the present secondary composition is particularly low. Oligomers, urethane oligomers, or urethane acrylate oligomers may be present as a minority component or completely absent from the secondary composition of the present disclosure. Oligomers, urethane oligomers, or urethane acrylate oligomers may be present in the secondary composition in an amount of about 3 wt % or less, or in an amount of about 2 wt % or less, or in an amount of about 1 wt % or less. The secondary composition may also be devoid of oligomers, urethane oligomers, or urethane acrylate oligomers.

The monomer component of the curable secondary composition may include one or more monomers. The one or more monomers may be present in the secondary composition in an amount of 50 wt % or greater, or in an amount from about 75 wt % to about 99 wt %, or in an amount from about 80 wt % to about 99 wt % or in an amount from about 85 wt % to about 98 wt %.

The monomer component of the curable secondary composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of monofunctional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated (4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Many suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

Representative polyfunctional ethylenically unsaturated monomers include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In addition to functioning as a polymerizable moiety, monofunctional monomers may also be included in the curable secondary composition for other purposes. Monofunctional monomer components may, for example, influence the degree to which the cured product absorbs water, adheres to other coating materials, or behaves under stress.

The secondary composition may or may not include an oligomeric component. As indicated hereinabove, if present, oligomers may be present as a minor constituent in the secondary composition. One or more oligomers may be present in the secondary composition. One class of oligomers that may be included in the secondary composition is ethylenically unsaturated oligomers. When employed, suitable oligomers may be monofunctional oligomers, polyfunctional oligomers, or a combination of a monofunctional oligomer and a polyfunctional oligomer. If present, the oligomer component of the secondary composition may include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The secondary composition may be free of urethane groups, urethane acrylate compounds, urethane oligomers, or urethane acrylate oligomers.

The oligomeric component the secondary composition may include a difunctional oligomer. A difunctional oligomer may have a structure according to formula (I) below:

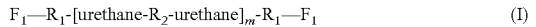

where $F_1$ may independently be a reactive functional group such as acrylate, methacrylate, acrylamide, N-vinyl amide, styrene, vinyl ether, vinyl ester, or other functional group known in the art; $R_1$ may include, independently, —$C_{2-12}$ O—, —($C_{2-4}$—O)$_n$—, —$C_{2-12}$ O—($C_{2-4}$—O)$_n$—, $C_{2-12}$ O—(CO—$C_{2-5}$ O)$_n$—, or —$C_{2-12}$ O—(CO—$C_{2-5}$ NH)$_n$— where n is a whole number from 1 to 30, including, for example, from 1 to 10; $R_2$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_2$ and/or $R_1$. The term "independently" is used herein to indicate that each $F_1$ may differ from another $F_1$ and the same is true for each $R_1$.

The oligomer component of the curable secondary composition may include a polyfunctional oligomer. The polyfunctional oligomer may have a structure according to formula (II), formula (III), or formula (IV) set forth below:

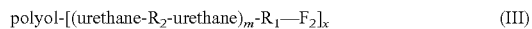

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include —$C_{2-12}$ O—, —($C_{2-4}$—O)$_n$—, —$C_{2-12}$ O—($C_{2-4}$—O)$_n$—, $C_{2-12}$ O—(CO—$C_{2-5}$ O)$_n$—, or —$C_{2-12}$ O—(CO—$C_{2-5}$ NH)$_n$— where n is a whole number from 1 to 10, including, for example, from 1 to 5; $R_2$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_2$. Similarly, the urethane group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis. The presence of minor proportions of polyureas in the secondary coating composition is not considered detrimental to coating performance, provided that the diamines or polyamines employed in the synthesis are sufficiently non-polar and saturated as to avoid compromising the moisture resistance of the system.

The secondary coating compositions may also contain a polymerization initiator to facilitate polymerization (curing) of the secondary composition after its application to a glass fiber or a glass fiber previously coated with a primary or other layer. Polymerization initiators suitable for use in the compositions of the present invention may include thermal initiators, chemical initiators, electron beam initiators, microwave initiators, actinic-radiation initiators, and photoinitiators. For many acrylate-based coating formulations, photoinitiators, such as the known ketonic photoinitiating and/or phosphine oxide additives, may be used. When used in the compositions of the present invention, the photoinitiator may be present in an amount sufficient to provide rapid ultraviolet curing. The photoinitiator may be present in an amount ranging from about 0.5 wt % to about 10 wt %, or from about 1.5 wt % to about 7.5 wt %, or in an amount of about 3 wt %.

The amount of photoinitiator may be adjusted to promote radiation cure to provide reasonable cure speed without causing premature gelation of the coating composition. A desirable cure speed may be a speed sufficient to cause curing of the coating composition of greater than about 90%, or greater than 95%). As measured in a dose versus modulus curve, a cure speed for coating thicknesses of about 75 μm may be, for example, less than 1.0 J/cm$^2$ or less than 0.5 J/cm$^2$.

Suitable photoinitiators may include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxyl-2-phenyl acetophenone (e.g., Irgacure, 651, BASF); bis(2,4,6-trimethylbenzoyl)phenyl phosphine oxide (e.g., Irgacure 819, BASF); (2,4,6-triethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to the above-described components, the secondary coating composition of the present invention may optionally include an additive or a combination of additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation).

The secondary composition may include thiodiethylene bis(3,5-di-tert-butyl)-4-hydroxyhydrocinnamate (e.g., Irganox 1035, available from BASF) as an antioxidant. The secondary composition may include an acrylated acid adhesion promoter (such as Ebecryl 170 (available from UCB Radcure (Smyrna Ga.)). Other suitable materials for use in secondary coating materials, as well as considerations related to selection of these materials, are well known in the art and are described in U.S. Pat. Nos. 4,962,992 and 5,104,433, the disclosures of which are hereby incorporated by reference.

Even with low oligomer content, the present secondary compositions may result in a secondary coating material having high tensile strength and a high modulus of elasticity (Young's modulus). The secondary coating may have a higher modulus of elasticity and higher glass transition temperature than the primary coating. As used herein, in situ modulus of the secondary coating is the modulus measured by the technique that is now described.

Secondary In Situ Modulus

Secondary in situ modulus is measured using fiber tube-off samples. To obtain a fiber tube-off sample, a 0.0055 inch Miller stripper is first clamped down approximately 1 inch from the end of the coated fiber. The one-inch region of fiber extending from the stripper is plunged into a stream of liquid nitrogen and held for 3 seconds. The fiber is then removed from the stream of liquid nitrogen and quickly stripped. The stripped end of the fiber is inspected to insure that the coating is removed. If coating remains on the glass, the sample is prepared again. The result is a hollow tube of primary and secondary coatings. The diameters of the glass, primary coating and secondary coating are measured from the end-face of the unstripped fiber.

To measure secondary in situ modulus, fiber tube-off samples can be run with an instrument such as a Rheometrics DMTA IV instrument at a sample gauge length 11 mm. The width, thickness, and length of the sample are determined and provided as input to the operating software of the instrument. The sample is mounted and run using a time sweep program at ambient temperature (21° C.) using the following parameters:

Frequency: 1 Rad/sec
Strain: 0.3%
Total Time=120 sec.
Time Per Measurement=1 sec
Initial Static Force=15.0 [g]
Static>Dynamic Force by=10.0 [%]

Once completed, the last five E' (storage modulus) data points are averaged. Each sample is run three times (fresh sample for each run) for a total of fifteen data points. The averaged value of the three runs is reported as the secondary in situ modulus.

The tensile strength of the polymerization product of the secondary composition of the present disclosure, when prepared in the form of cured rods, may be at least 50 MPa. When measured on cured coating rods at room temperature (~21° C.), the modulus of elasticity of the cured product of the secondary composition may be in the range from about 1400 MPa to about 2200 MPa, or in the range from about 1700 MPa to about 2100 MPa, or in the range from about 1600 MPa to about 3000 MPa. The in situ modulus of elasticity of the secondary coating may be 1200 MPa or greater, or 1500 MPa or greater, or 1800 MPa or greater, or 2100 MPa or greater, or 2400 MPa or greater, or 2700 MPa or greater.

Young's Modulus, Tensile Strength and % Elongation at Break

Coating compositions are prepared in the form of rod samples for tensile testing. Rods are prepared by injecting the curable compositions into Teflon® tubing having an inner diameter of about 0.025". The rod samples are cured using a Fusion D bulb at a dose of about 2.4 J/cm$^2$ (measured over a wavelength range of 225-424 nm by a Light Bug model IL390 from International Light). After curing, the Teflon® tubing is stripped away to provide rod samples of the coating composition. The cured rods are allowed to condition overnight at 23° C. and 50% relative humidity. Properties such as Young's modulus, tensile strength, and % elongation at break are measured using a tensile testing instrument (e.g., a Sintech MTS Tensile Tester, or an Instron Universal Material Test System) on defect-free rod samples with a gauge length of 51 mm, and a test speed of 250 mm/min. The properties are determined as an average of at least five samples, with defective samples being excluded from the average.

High modulus secondary coatings may offer better protection of the fiber against mechanical damage and better microbend performance. However, high speed processing of high modulus secondary coatings in the draw tower may be a challenge because of an increased tendency to of the draw process to generate defects such as flat spots and wind induced point defects (WIPD) in the secondary coating that ultimately compromise fiber performance.

During the development of oligomer-free coatings urethane-oligomer-free coatings and urethane-acrylate-oligomer-free coatings, it was found that removal of the oligomer from the formulation, without modifying other components, may result in a secondary coating with a modulus of higher than 2000 MPa. Such secondary coatings that may be difficult to process at high speeds in the draw tower. Accordingly, it may be desirable to compensate for the effect of removing the oligomer by formulating the secondary composition to include monomers with long flexible (e.g. ethoxylated) chains between functional groups. Long flexible chains may increase the distance between crosslinks, may decrease the crosslink density and may ultimately lower the modulus of the cured secondary coating. A potential drawback of such monomers is that they may have a lower glass transition temperature (Tg) and may tend to decrease the Tg of the cured secondary coating. Secondary coatings with low Tg may not be desirable because a low Tg may result in a material that is too soft at the time of application and may lead to defects during processing at high speed. Higher Tg secondary coatings may be harder at room temperature and may provide better mechanical protection to the optical fiber. If the Tg is too high, however, the coating may be sufficiently stiff to make the fiber more prone to defects during processing.

The secondary coating of the present disclosure may be designed to achieve a secondary coating with moderate Tg that imparts adequate mechanical protection and bend insensitivity to the optical fiber while still allowing the fiber to be processed defect-free in high speed draw towers. Tg can be measured using the technique that is now described.

Glass transition temperatures are measured using samples in the form of cured films (primary coating) or rods (secondary coating) formed from the coating composition. Glass transition temperatures are measured by determining the peak of the tan δ curves obtained from an instrument such as a Rheometrics DMTA IV in tension. The width, thickness, and length of the sample are input to the "Sample Geometry" section of the program. The sample is mounted and then cooled to approximately −85° C. Once stable, a temperature ramp is run using the following parameters:

Frequency: 1 Hz
Strain: 0.3%
Heating Rate: 2° C./min.
Final Temperature: 150° C.
Initial Static Force=20.0 [g]
Static>Dynamic Force by=10.0 [%]

Tg is defined as the maximum of the tan δ peak, where the tan δ peak is defined as:

$$\tan \delta = E''/E'$$

where E" is the loss modulus, which is proportional to the loss of energy as heat in a cycle of deformation and E' is the storage or elastic modulus, which is proportional to the energy stored in a cycle of deformation.

The Tg of cured rods prepared from the cured product of the secondary coating composition may be at least about 50° C. The glass transition temperature of the secondary coating may be at least 50° C., or at least 55° C., or at least 60° C., or between 55° C. and 65° C.

The secondary composition may be devoid of an oligomeric component, a urethane oligomeric component, or a urethane-acrylate oligomeric component, and the monomeric component may include ethoxylated (4) bisphenol-A diacrylate monomer, ethoxylated (30) bisphenol-A diacrylate monomer, and epoxy diacrylate monomer. The ethoxylated (4) bisphenol-A diacrylate monomer may be present in an amount ranging from about 50 wt % to about 90 wt %, or from about 60 wt % to about 80 wt %, or and from about 70 wt % to about 75 wt %. The ethoxylated (30) bisphenol-A diacrylate monomer may be present in an amount ranging from about 5 wt % to about 20 wt %, or from about 7 wt % to about 15 wt %, or from about 8 wt % to about 12 wt %. The epoxy diacrylate monomer may be present in an amount of ranging from about 5 wt % to about 25 wt %, or from about 10 wt % to about 20 wt %, or from about 12 wt % to about 18 wt %.

The secondary composition may be devoid of an oligomeric component, a urethane oligomeric component, or a urethane-acrylate oligomeric component, and the monomeric component may include ethoxylated (4) bisphenol-A diacrylate monomer, ethoxylated (10) bisphenol-A diacrylate monomer, and epoxy diacrylate monomer. The ethoxylated (4) bisphenol-A diacrylate monomer may be present in an amount ranging from about 30 wt % to about 80 wt %, or from about 40 wt % to about 70 wt %, or from about 50 wt % to about 60 wt %. The ethoxylated (10) bisphenol-A diacrylate monomer may be present in an amount ranging from about 10 wt % to about 50 wt %, or from about 20 wt % to about 40 wt %, or from about 25 wt % to about 35 wt %. The epoxy diacrylate monomer may be present in an amount ranging from about 5 wt % to about 25 wt %, or from about 10 wt % to about 20 wt %, or from about 12 wt % to about 18 wt %.

The secondary composition may be devoid of an oligomeric component, a urethane oligomeric component, or a urethane-acrylate oligomeric component, and the monomeric component may include ethoxylated (4) bisphenol-A diacrylate monomer, ethoxylated (10) bisphenol-A diacrylate monomer, ethoxylated (30) bisphenol-A diacrylate monomer, and epoxy diacrylate monomer. The ethoxylated (4) bisphenol-A diacrylate monomer may be present in an amount ranging from about 40 wt % to about 80 wt %, or from about 60 wt % to about 70 wt %. The ethoxylated (10) bisphenol-A diacrylate monomer may be present in an amount ranging from about 1 wt % to about 30 wt %, or from about 5 wt % to about 10 wt %. The ethoxylated (30) bisphenol-A diacrylate monomer may be present in an amount ranging from about 5 wt % to about 20 wt %, or in an amount of about 10 wt %. The epoxy diacrylate monomer may be present in an amount ranging from about 5 wt % to about 25 wt %, or in an amount of about 15 wt %.

The secondary composition may be devoid of an oligomeric component, a urethane oligomeric component, or a urethane-acrylate oligomeric component, and the monomeric component may include ethoxylated (10) bisphenol A diacrylate monomer, tripropylene glycol diacrylate monomer, ethoxylated (4) bisphenol A diacrylate monomer, and epoxy diacrylate monomer. The ethoxylated (10) bisphenol A diacrylate monomer may be present in an amount ranging from about 10 wt % to about 50 wt %. The tripropylene glycol diacrylate monomer may be present in an amount from about 5 wt % to about 40 wt %. The ethoxylated (4) bisphenol A diacrylate monomer may be present in an amount from about 10 wt % to about 55 wt %. The epoxy diacrylate monomer may be present in an amount up to about 15 wt %.

The secondary composition may comprise from about 40 wt % to 80 wt % of ethoxylated (4) bisphenol A monomer, from about 0 wt % to about 30% of ethoxylkated (10) bisphenol A monomer, from about 0 wt % to about 25% wt % of ethoxylated (30) bisphenol A monomer, from about 5 wt % to 18 wt % of epoxy acrylate, from about 0 wt % to 10 wt % of tricyclodecane dimethanoldiacrylate monomer, from about 0.1 wt % to 40% of one or more photoinitiators, from about 0 pph to 5 pph by weight of slip additive; and from 0 pph to about 5 pph by weight of an antioxidant. The secondary composition may further comprise 3% or less oligomer, or 1% or less oligomer, or may be devoid of oligomer. The epoxy acrylate may be an epoxy acrylate monomer. The epoxy acrylate may be bisphenol A epoxy diacrylate. The epoxy acrylate may be an unmodified epoxy acrylate, for example an epoxy acrylate which is not modified with fatty acid, amine, acid, or aromatic functionality. Such compositions may have a viscosity at 45° C. of at least about 3 Poise and when cured, may exhibit a Young's modulus of from about 1400 MPa to about 2100 MPa. The compositions may exhibit a glass transition temperature of at least about 55° C. The monomeric component may include an alkoxylated bisphenol A diacrylate monomer having at least 10 alkoxy groups.

The primary and secondary curable compositions may be applied to the glass portion of the coated fiber after it has been drawn from the preform. The primary and secondary compositions may be applied immediately after cooling. The curable compositions may then be cured to produce the coated optical fiber. The method of curing may be thermal, chemical, or radiation induced, such as by exposing the applied curable composition on the glass fiber to ultraviolet light, actinic radiation, microwave radiation, or an electron beam, depending upon the nature of the coating composition(s) and polymerization initiator being employed. It may be advantageous to apply both a primary curable composition and a secondary curable composition in sequence following the draw process. Methods of applying dual layers of curable compositions to a moving glass fiber are disclosed in U.S. Pat. Nos. 4,474,830 and 4,585,165, the disclosures of which are hereby incorporated by reference herein. The primary curable composition may alternatively be applied and cured to form the primary coating material before applying and curing the secondary curable composition to form the secondary coating.

EXAMPLES

Various exemplary coated fibers in accordance with the present disclosure are now described and modeled to illustrate one or more advantageous features disclosed herein.

The coated fibers modeled for these examples included a glass fiber with a diameter of 125 µm. The core of the glass fiber had a radius ranging between 4 to 10 µm and may be made by modifying silica with $GeO_2$ to increase the index of the core relative to the cladding. The cladding surrounded the core, extended to a radius of 62.5 µm and included an inner cladding region and an outer cladding region where the inner cladding region had a lower index than the outer cladding. The lower index of the inner cladding region relative to the outer cladding may be achieved by doping the inner cladding with the downdopant fluorine. Alternatively, the higher index of the outer cladding region relative to the inner cladding region may be achieved by doping the outer cladding with updopants such as chlorine, germania, alumina, titania, silicon oxynitride, phosphorus, etc. Exemplary refractive index profiles will be discussed more fully hereinbelow.

Representative curable compositions A-H for the primary coating are shown in Table I below.

TABLE I

Illustrative Primary Coating Compositions

| Component | A | B | C | D | E | F | G | H |
|---|---|---|---|---|---|---|---|---|
| Photomer 4066 (wt %) | 41.5 | 0 | 61.5 | 41.5 | 46.5 | 46.5 | 45.5 | 47 |
| Photomer 4960 (wt %) | 0 | 41.5 | 0 | 0 | 0 | 0 | 0 | 0 |

TABLE I-continued

Illustrative Primary Coating Compositions

| Component | A | B | C | D | E | F | G | H |
|---|---|---|---|---|---|---|---|---|
| BR3741 (wt %) | 55 | 55 | 35 | 55 | 50 | 50 | 50 | 50 |
| N-vinyl caprolactam (wt %) | 2 | 2 | 2 | 2 | 2 | 2 | 2 | 1.5 |
| TPO (wt %) | 1.5 | 1.5 | 1.5 | 1.5 | 1.5 | 1.5 | 2.5 | 1.5 |
| (3-acryloxypropyl) trimethoxysilane (pph) | 1 | 1 | 1 | 1 | 1 | 0.8 | 0.8 | 0.8 |
| Irganox 1035 (pph) | 1 | 1 | 1 | 1 | 1 | 1 | 1 | 1 |
| Pentaerythritol mercaptopropionate (pph) | 0.03 | 0.03 | 0.03 | 0.03 | 0.03 | 0.03 | 0.03 | 0.03 |
| Uvitex OB (pph) | 0.05 | 0 | 0 | 0 | 0 | 0 | 0 | 0 |

Photomer 4066 is an ethoxylated nonyl phenol acrylate available from IGM Resins. Photomer 4960 is a propoxylated nonyl phenol acrylate available from IGM Resins. BR3741 is an aliphatic polyether urethane acrylate oligomer available from Dymax Oligomers and Coatings. N-vinyl caprolactam is available from ISP Technologies, Inc. TPO ((2,4,6-trimethylbenzoyl)diphenyl phosphine oxide) is a photoinitiator available from BASF. (3-acryloxypropyl) trimethoxysilane is an adhesion promoter available from Gelest. IRGANOX 1035 ((thiodiethylene bis[3-(3,5-di-tert-butyl)-4-hydroxyphenyl) propionate]) is an antioxidant available from BASF. Pentaerythritol mercaptopropionate is an adhesion promoter stabilizer available from Aldrich. UVITEX OB ($C_{26}H_{26}N_2O_2S$, CAS No. 7128-64-5) is an optical brightener available from BASF.

To prepare the primary composition, the oligomer and monomer(s) may be blended together for at least 10 minutes at 60° C. Photoinitiator(s) and additives may then be added, and blending may be continued for one hour. Finally, the adhesion promoter may be added, and blending may be continued for 30 minutes. The resulting solution may then be applied to the glass portion of the fiber and UV-cured to form a primary coating.

Representative curable compositions J-L for the secondary coating are shown in Table II below.

TABLE II

Illustrative Secondary Coating Compositions

| Component | J | K | L |
|---|---|---|---|
| SR601/Photomer4028 (wt %) | 72 | 52 | 72 |
| CD9038 (wt %) | 10 | 0 | 10 |
| Photomer3016 (wt %) | 15 | 15 | 15 |
| SR602 (wt %) 30 wt % | 0 | 30 | 0 |
| Irgacure 184 (wt %) | 1.5 | 1.5 | 1.5 |
| TPO (wt %) | 1.5 | 1.5 | 1.5 |
| DC190 Fluid slip additive (pph) | 0 | 0 | 1 |
| Irganox 1035 (pph) | 0.5 | 1 | 1 |

SR601/Photomer 4028 is an ethoxylated (4) bisphenol A diacrylate monomer available from Sartomer or IGM Resins. CD9038 is an ethoxylated (30) bisphenol A diacrylate monomer available from Sartomer. Photomer 3016 is an epoxy diacrylate monomer available from IGM Resins. SR602 is an ethoxylated (10) bisphenol A diacrylate monomer available from Sartomer. IRGACURE 184 (1-hydroxycyclohexylphenyl ketone) is a photoinitiator available from BASF. TPO ((2,4,6-trimethylbenzoyl)-diphenyl phosphine oxide) is a photoinitiator available from BASF. DC190 is a fluid slip additive available from Dow Corning. IRGANOX 1035 (thiodiethylene bis(3,5-di-tert-butyl)-4-hydroxyhydrocinnamate) is an antioxidant available from BASF.

Secondary compositions may be prepared with the listed components using commercial blending equipment. The monomer components may be weighed, introduced into a heated kettle, and blended together at a temperature within the range of from about 50° C. to 65° C. Blending may then be continued until a homogenous mixture is obtained. Next, the photoinitiator may be weighed and introduced into the homogeneous solution while blending. Finally, the remaining components may be weighed and introduced into the solution while blending. Blending may be continued until a homogeneous solution is again obtained. The homogeneous solution may then be applied to the primary coating or primary composition of the fiber and cured with UV radiation to form a secondary coating.

Coated fibers with a 125 μm-diameter core-cladding glass region and primary and secondary coatings having properties consistent with the coatings achievable by curing the primary and secondary compositions listed in Tables I and II were modeled. The coated fiber characteristics upon which the models were based are now described for five exemplary coated fibers. The exemplary coated fibers will be referred to by sample numbers 1, 2, 3, 4, and 5.

Figure 4:
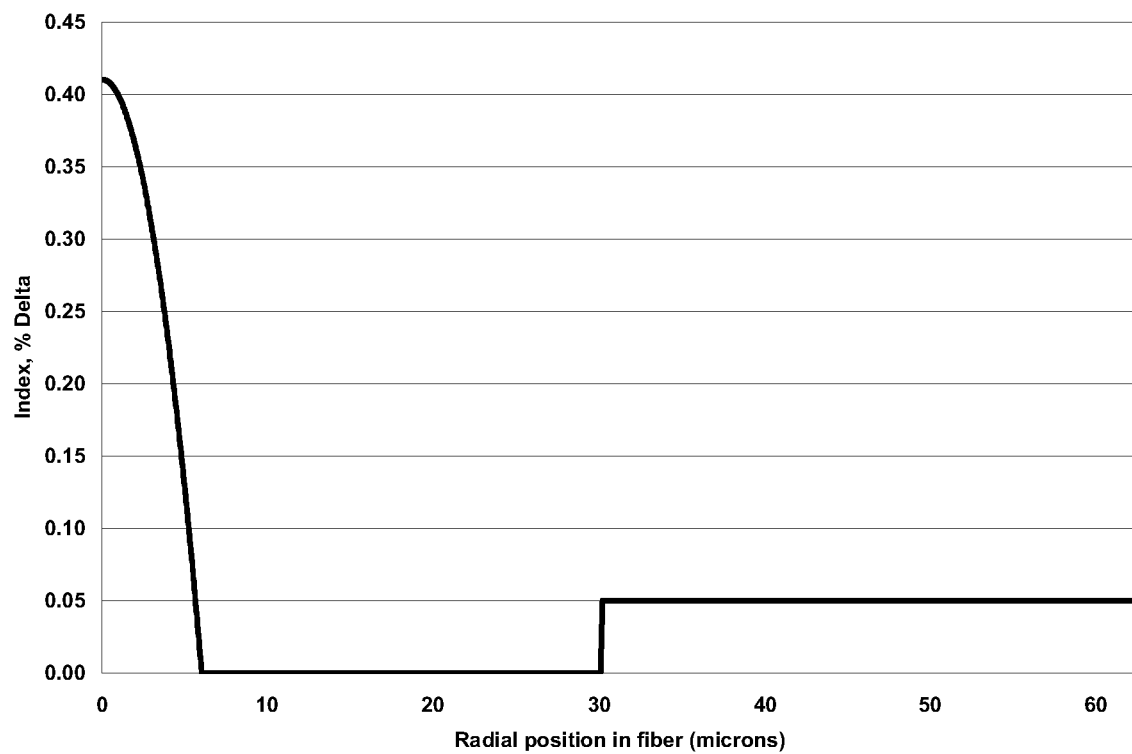
FIG. 4 depicts a core-cladding refractive index profile having a rectangular trench.

The refractive index profile, expressed in Δ % relative to pure silica glass, for exemplary coated fiber 1 is shown in FIG. 4. Coated fiber 1 included a core with an outer radius $r_1$ of 6 μm and index profile $\Delta_1$ based on an α-profile with α=2, with maximum core index $\Delta_{1MAX}$ of 0.41%. An inner cladding of silica surrounded the core and extended to an outer radius $r_3$ of 30 μm. An outer cladding surrounded the inner cladding, extended to a radius $r_4$ of 62.5 μm and had index $\Delta_4$ of about 0.05%.

Figure 5:
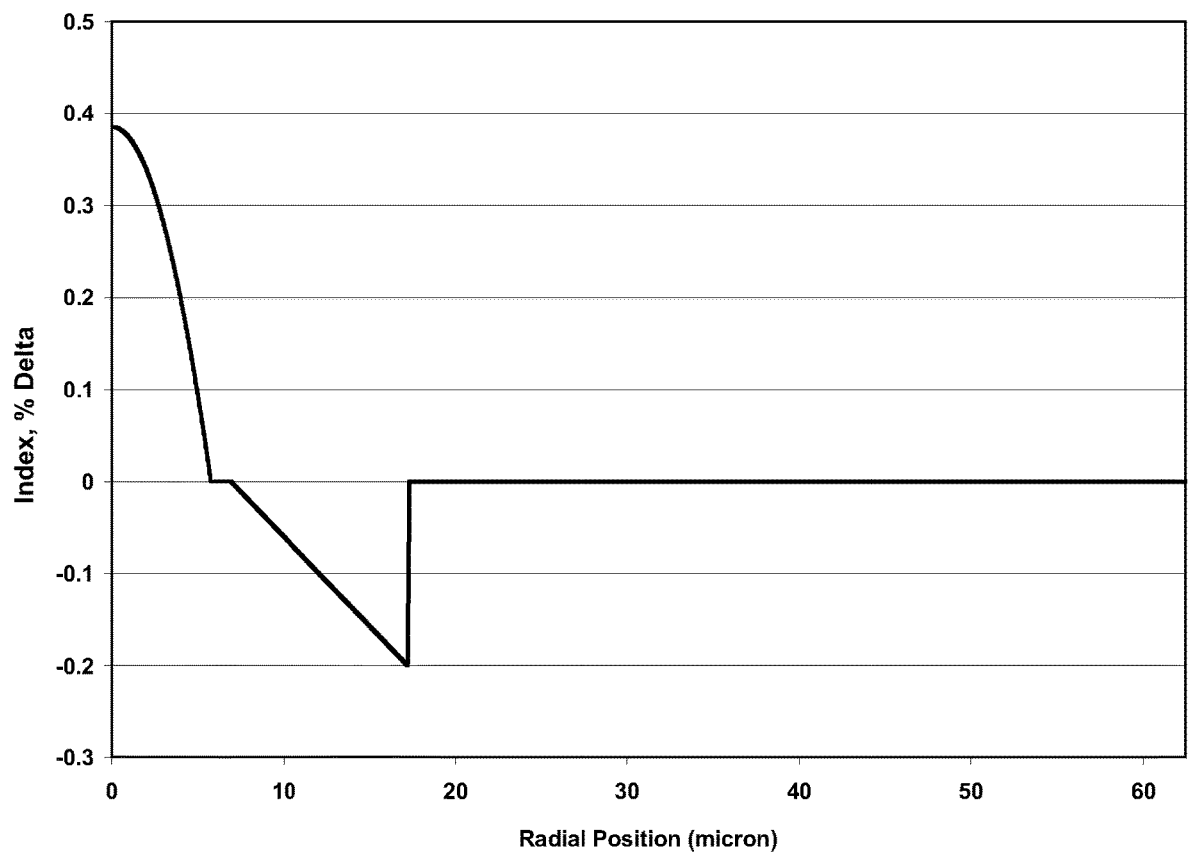
FIG. 5 depicts the core-cladding refractive index profile having a triangular trench.

The refractive index profile, expressed in Δ % relative to pure silica glass, for exemplary coated fiber 2 is shown in FIG. 5. Coated fiber 2 included a core with an outer radius $r_1$ of 5.73 μm and index profile $\Delta_1$ based on an α-profile with α=2, with maximum core index $\Delta_{1MAX}$ of 0.385%. A first inner cladding of silica surrounded the core and extended to an outer radius $r_2$ of 6.88 μm. A second inner cladding surrounded the first inner cladding and extended to an outer radius $r_3$ of 17.2 μm. The second inner cladding included a fluorine-doped triangular trench region that provided a linear decrease in index from $\Delta_3$=0% at radius $r_2$ to $\Delta_3$=−0.2% at a radius $r_3$. An outer cladding of silica surrounded the second inner cladding and extended to a radius $r_4$ of 62.5 μm.

In the modelling, exemplary coated fibers 1 and 2 were each treated as having a primary coating with an outer diameter of 165 μm and an in situ modulus of less than 0.50 MPa, and a secondary coating with an outer diameter of 200 μm and an in situ modulus of greater than 1600 MPa. The primary and secondary coating compositions listed in Tables 1 and 2 are expected to yield cured primary and secondary coatings having these characteristics.

The modelled characteristics of exemplary coated fibers 1 and 2 are presented in Table III. Modelled performance data included cutoff wavelength (LP11 mode and cable), mode field diameter (at 1310 nm and 1550 nm), zero dispersion wavelength, dispersion and dispersion slope at 1310 nm and 1550 nm, macrobending losses at 1550 nm (based on the mandrel wrap test using mandrels with diameters of 10 mm, 20 mm, and 30 mm), and microbending losses at 1550 nm (based on the pin array and lateral load tests). The modelling data show that the exemplary coated fibers 1 and 2 are low-diameter fibers that exhibit (1) a mode field diameter compatible with efficient splicing and connection to standard single-mode fibers and (2) low bending losses.

TABLE III

Fiber Performance Data

| Parameter | Coated Fiber 1 | Coated Fiber 2 |
|---|---|---|
| 1310 nm MFD (μm) | 9.2 | 9.2 |
| 1550 nm MFD (μm) | 10.51 | 10.43 |
| Zero Dispersion Wavelength (nm) | 1319 | 1320 |
| Dispersion at 1310 nm (ps/nm/km) | −0.801 | −0.909 |
| Dispersion Slope at 1310 nm (ps/nm²/km) | 0.089 | 0.0909 |
| Dispersion at 1550 nm (ps/nm/km) | 17.27 | 17.65 |
| Dispersion Slope at 1550 nm (ps/nm²/km) | 0.06 | 0.0626 |
| Cable Cutoff (22-meter) (nm) | 1209 | 1229 |
| Bend Loss at 1550 nm - 10 mm Diameter Mandrel (dB/turn) | 1.13 | 1.52 |
| Bend Loss at 1550 nm - 15 mm Diameter Mandrel (dB/turn) | 0.279 | 0.337 |
| Bend Loss at 1550 nm - 20 mm Diameter Mandrel (dB/turn) | 0.068 | 0.074 |
| Bend Loss at 1550 nm - 30 mm Diameter Mandrel (dB/turn) | 0.006 | 0.003 |
| Bend Loss at 1550 nm - Pin Array (dB) | 21.73 | 9.89 |
| Bend Loss at 1550 nm - Lateral Load (dB) | 0.229 | 0.223 |

Figure 6:
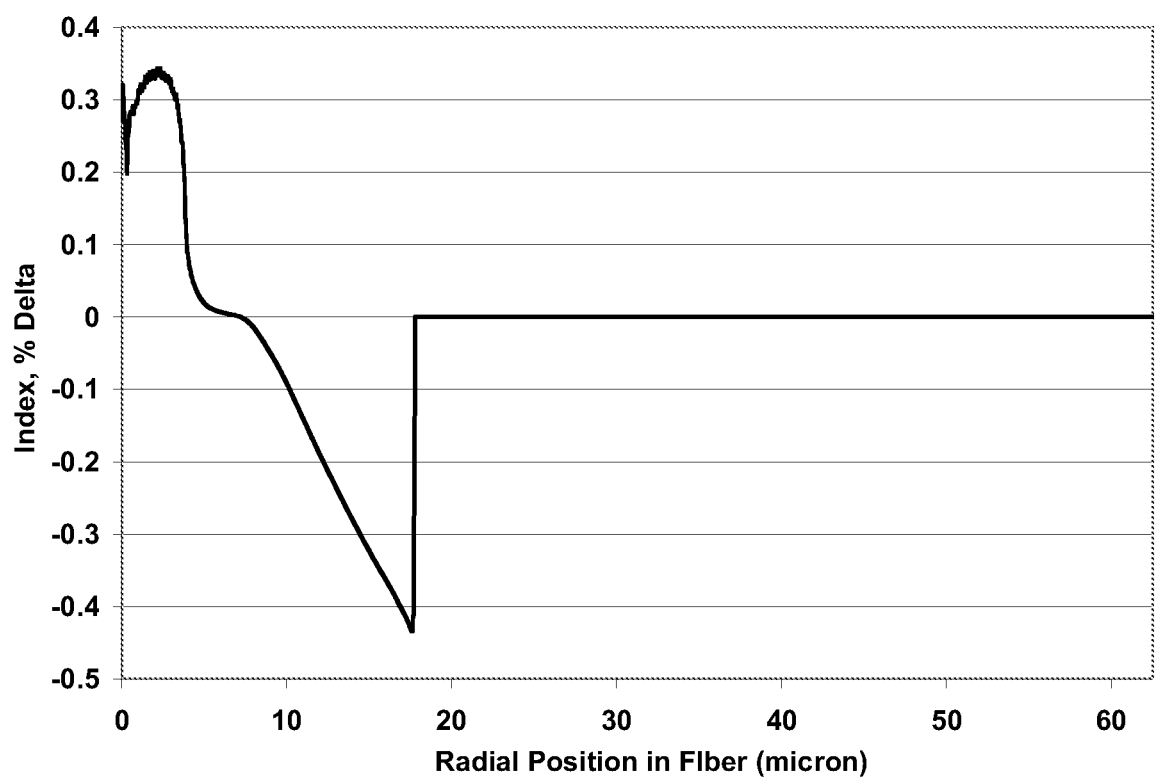
FIG. 6 depicts the core-cladding refractive index profile having a triangular trench.

The refractive index profile, expressed in Δ % relative to pure silica glass, for exemplary coated fiber 3 is shown in FIG. 6. The refractive index profile of each of the coated fibers 3, 4, and 5 was similar in profile shape and the profiles are described in Table IV. Each of exemplary coated fibers 3, 4, and 5 included a high index core that extended to an outer radius $r_1$ of about 4.5 μm, a first inner cladding region extending between radius $r_1$ and an outer radius $r_2$ of about 7 μm, a second inner cladding region between radius $r_2$ and an outer radius $r_3$ of about 18 μm, and an outer cladding region extending between radius $r_3$ and an outer radius $r_4$ of 62.5 μm. The refractive index of the second inner cladding region continuously decreased with increasing radial position as shown to form a triangular trench in the index profile of exemplary coated fibers 3, 4, and 5.

In the modelling, exemplary coated fibers 3, 4, and 5 were each treated as having a primary coating with an outer diameter of 165 μm and an in situ modulus of less than 0.5 MPa, and a secondary coating with an outer diameter of 200 μm and an in situ modulus of greater than 1600 MPa. The primary and secondary coating compositions listed in Tables 1 and 2 are expected to yield cured primary and secondary coatings having these characteristics.

The modelled characteristics of exemplary coated fibers 3, 4, and 5 are presented in Table IV. Table IV lists numerical values for the refractive index and radial positions of the core region (region 1), first inner cladding region (region 2), second inner cladding region (region 3), and outer cladding region (region 4). Modelled performance data included cutoff wavelength (core and cable), mode field diameter (for both core and fiber at 1310 nm), zero dispersion wavelength, core MAC number (ratio of mode field diameter at 1310 nm to the cable cutoff wavelength), and macrobending losses at 1550 nm (based on the mandrel wrap test using mandrels with diameters of 10 mm, 20 mm, and 30 mm).

The model indicates that each of exemplary coated fibers 3, 4, and 5 exhibited a MFD at 1310 nm greater than 9 nm, macrobend losses at a wavelength of 1550 nm of less than 0.35 dB/turn for a 10 mm diameter mandrel, less than 0.09 dB/turn for a 15 mm diameter mandrel, less than 0.025 dB/turn for a 20 mm mandrel and less than 0.004 dB/turn for a 30 mm diameter mandrel. Each of exemplary coated fibers 3, 4, and 5 exhibited a cable cutoff of less than 1260 nm and a zero dispersion wavelength between 1.3 μm and 1.324 μm. The modelling results show that exemplary coated fibers 3, 4, and 5 are low-diameter fibers that exhibit both (1) a mode field diameter compatible with efficient splicing and connection to standard single-mode fibers and (2) low bending losses.

TABLE IV

Fiber Performance Data

| Parameter | Coated Fiber 3 | Coated Fiber 4 | Coated Fiber 5 |
|---|---|---|---|
| $\Delta_1$, max (%) | 0.345 | 0.34 | 0.335 |
| $r_1$ (μm) | 4.55 | 4.58 | 4.6 |
| $\Delta_2$ (%) | 0 | 0 | 0 |
| $r_2$ (μm) | 7.17 | 7.2 | 7.25 |
| $\Delta_3$, min (%) | −0.435 | −0.435 | −0.435 |
| $r_3$ (μm) | 17.7 | 17.8 | 17.9 |
| $\Delta_4$ (%) | 0 | 0 | 0 |
| Moat Volume (% μm$^2$) | 62.93 | 63.65 | 64.36 |
| MFD at 1310 nm (μm) | 9.12 | 9.18 | 9.24 |
| Zero Dispersion Wavelength (μm) | 1.321 | 1.321 | 1.32 |
| Cable Cutoff (22-meter) (nm) | 1226 | 1226 | 1226 |
| Bend Loss at 1550 nm - 10 mm Diameter Mandrel (dB/turn) | 0.27 | 0.276 | 0.31 |
| Bend Loss at 1550 nm - 15 mm Diameter Mandrel (dB/turn) | 0.07 | 0.074 | 0.08 |
| Bend Loss at 1550 nm - 20 mm Diameter Mandrel (dB/turn) | 0.017 | 0.019 | 0.02 |
| Bend Loss at 1550 nm - 30 mm Diameter Mandrel (dB/turn) | 0.003 | 0.003 | 0.0037 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
   a core, said core having an outer radius $r_1$; and
   a cladding surrounding said core, said cladding having an outer radius $r_4$, said cladding including a depressed index region, said depressed index region having a triangular relative refractive index profile and a moat volume with a magnitude between 30% μm$^2$ and 75% μm$^2$;
   wherein said optical fiber has a mode field diameter of 9.1 μm or greater at a wavelength of 1310 nm, a cable cutoff wavelength of 1260 nm or less, a zero dispersion wavelength $\lambda_0$ in the range 1300 nm ≤ $\lambda_0$ ≤ 1324 nm, a bend loss at a wavelength of 1550 nm, when turned about a mandrel having a diameter of 15 mm, of less than 0.5 dB/turn, and a bend loss at a wavelength of 1550 nm, when turned about a mandrel having a diameter of 30 mm, of less than 0.004 dB/turn.

2. The optical fiber of claim 1, wherein said optical fiber has a bend loss at a wavelength of 1550 nm, when turned around a mandrel having a diameter of 30 mm, of less than or equal to 0.003 dB/turn.

3. The optical fiber of claim 1, wherein said optical fiber has a bend loss at a wavelength of 1550 nm, when turned around a mandrel having a diameter of 20 mm, of less than or equal to 0.2 dB/turn.

4. The optical fiber of claim 1, wherein said optical fiber has a bend loss at a wavelength of 1550 nm, when turned around a mandrel having a diameter of 20 mm, of less than or equal to 0.1 dB/turn.

5. The optical fiber of claim 1, wherein said optical fiber has a bend loss at a wavelength of 1550 nm, when turned around a mandrel having a diameter of 15 mm, of less than or equal to 0.25 dB/turn.

6. The optical fiber of claim 1, wherein said moat volume is less than 60%μm$^2$.

7. The optical fiber of claim 1, wherein said mode field diameter is 9.2 μm or greater.

8. The optical fiber of claim 1, further comprising:
   a primary coating surrounding said cladding, said primary coating having an in situ modulus of 0.50 MPa or less; and
   a secondary coating surrounding said primary coating, said secondary coating having an in situ modulus of 1500 MPa or greater.

9. The optical fiber of claim 8, wherein said primary coating has an in situ modulus of 0.20 MPa or less and said secondary coating has an in situ modulus of 1800 MPa or greater.

10. The optical fiber of claim 8, wherein said primary coating has a glass transition temperature of less than −15° C. and greater than −50° C.

11. The optical fiber of claim 1, wherein said triangular relative refractive index profile has a minimum relative refractive index $\Delta_{3MIN}$ and said cladding further includes an outer cladding region surrounding said depressed index region, said outer cladding region having a relative refractive index $\Delta_4 > \Delta_{3MIN}$.

* * * * *

UNITED STATES PATENT AND TRADEMARK OFFICE
CERTIFICATE OF CORRECTION

| | |
|---|---|
| PATENT NO. | : 11,150,403 B2 |
| APPLICATION NO. | : 16/839806 |
| DATED | : October 19, 2021 |
| INVENTOR(S) | : Dana Craig Bookbinder et al. |

It is certified that error appears in the above-identified patent and that said Letters Patent is hereby corrected as shown below:

On the Title Page

On page 3, in Column 2, item (56), Other Publications, Line 9, delete "Chern." and insert -- Chem. --, therefor.

In the Claims

In Column 28, Line 31, Claim 6, delete "60%μm$^2$." and insert -- 60% μm$^2$. --, therefor.

Signed and Sealed this
Thirtieth Day of January, 2024

Katherine Kelly Vidal
*Director of the United States Patent and Trademark Office*